(12) United States Patent
Hayashi et al.

(10) Patent No.: US 8,611,199 B2
(45) Date of Patent: Dec. 17, 2013

(54) OBJECTIVE LENS ELEMENT AND OPTICAL PICKUP DEVICE

(75) Inventors: Katsuhiko Hayashi, Nara (JP); Yoshiaki Komma, Osaka (JP); Yasuhiro Tanaka, Hyogo (JP); Michihiro Yamagata, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/248,042

(22) Filed: Sep. 29, 2011

(65) Prior Publication Data

US 2012/0075982 A1   Mar. 29, 2012

(30) Foreign Application Priority Data

Sep. 29, 2010 (JP) .................................. 2010-219877
Jul. 27, 2011 (JP) .................................. 2011-164628

(51) Int. Cl.
   *G11B 7/135* (2012.01)
(52) U.S. Cl.
   USPC .................................................... 369/112.03
(58) Field of Classification Search
   None
   See application file for complete search history.

(56) References Cited

U.S. PATENT DOCUMENTS 6,337,841 B1 * 1/2002 Kim et al. ................ 369/112.06

FOREIGN PATENT DOCUMENTS

| JP | 2002-298422 A | 10/2002 |
| JP | 2005-129227 A | 5/2005 |
| JP | 2005-243151 A | 9/2005 |

* cited by examiner

*Primary Examiner* — Joseph Feild
*Assistant Examiner* — Parul Gupta
(74) *Attorney, Agent, or Firm* — Judge Patent Associates

(57) ABSTRACT

An optical pickup device is provided which is compatible with at least two types of optical disc standards having different NAs and which controls an effective NA when a light beam for an optical disc standard having a relatively small NA is converged, thereby forming a desired spot. An inner part 131B and an outer part 131F of an objective lens element 143 are provided with diffraction structures different from each other. A condition (1), DO11×DO12>0, and a condition (2), DO21×DO22<0, are satisfied (DO11 (DO21) is the diffraction order of the diffracted light beam having the highest diffraction efficiency among light beams of the wavelength $\lambda_1$ ($\lambda_2$) diffracted by the diffraction structure on the inner part; and DO12 (DO22) is the diffraction order of the diffracted light beam having the highest diffraction efficiency among light beams of the wavelength $\lambda_1$ ($\lambda_2$) diffracted by the diffraction structure on the outer part).

3 Claims, 17 Drawing Sheets

US 8,611,199 B2

OBJECTIVE LENS ELEMENT AND OPTICAL PICKUP DEVICE

CROSS REFERENCE TO RELATED APPLICATION

The disclosure of Japanese Patent Application No. 2010-219877 filed on Sep. 29, 2010 and Japanese Patent Application No. 2011-164628 filed on Jul. 27, 2011 are incorporated herein by reference.

BACKGROUND OF THE INVENTION

1. Field of the Invention

The present invention relates to an objective lens element used for performing at least one of recording, reproducing, or erasing of information on an information recoding surface of an optical information storage medium, and an optical pickup device including the objective lens element.

2. Description of the Background Art

In recent years, researches and developments have been actively carried out concerning high-density optical discs that have an increased recording density by using a blue laser beam with a wavelength of about 400 nm and thus have an improved storage capacity. One of the standards of such high-density optical discs is Blu-Ray Disc (registered trademark; hereinafter, referred to as "BD") in which the image side numerical aperture (NA) of an objective lens is set to about 0.85 and the thickness of a protective base plate on an information recoding surface of an optical disc is set to about 0.1 mm.

Other than BD, DVD (protective base plate thickness: about 0.6 mm) for which a red laser beam with a wavelength of about 680 nm is used, and CD (protective base plate thickness: about 1.2 mm) for which an infrared laser beam with a wavelength of about 780 nm is used also exist. Various objective lenses that are compatible with three types of standards of these discs have been proposed.

For example, Japanese Patent No. 3993870 discloses an optical element and an optical pickup device that are compatible with the three types of the standards of BD, DVD, and CD. An objective lens disclosed in Japanese Patent No. 3993870 is provided with a stair-like diffraction structure (also referred to as binary type diffraction structure) in which stair-like steps are periodically arranged. The height of each step is set such that a difference in optical path of about 1.25 wavelengths is provided to a light beam having a shortest designed wavelength. In addition, one periodic structure consists of four steps that are consecutive in a radial direction (the height from a base surface is 0 to 3 times that of a unit step).

Since such a step structure is provided, the diffraction efficiency of a +1st order diffracted light beam can be at its maximum when a light beam of a wavelength for BD is used, and the diffraction efficiency of a −1st order diffracted light beam can be at its maximum when a light beam of a wavelength for DVD is used. Thus, use of change in an angle of diffraction with respect to a wavelength makes it possible to compensate for a spherical aberration that occurs due to differences in wavelength and disc base material thickness when changing between BD and DVD.

Further, Japanese Laid-Open Patent Publication No. 2005-243151 discloses an objective lens that is compatible with DVD and a high-density optical disc for which a violet light semiconductor laser is used. The objective lens disclosed in Japanese Laid-Open Patent Publication No. 2005-243151 is provided with a plurality of ring-shaped steps on an optical function surface thereof. The depth of each ring-shaped step is set such that the diffraction efficiency of a +3rd order diffracted light beam is at its maximum when a light beam of a wavelength for the high-density optical disc is used and the diffraction efficiency of a +2nd order diffracted light beam is at its maximum when a light beam of a wavelength for DVD is used.

When the numerical aperture (NA) for the high-density optical disc is higher than the NA for DVD, the outer circumferential portion of the optical function surface of the objective lens is a region dedicated for the high-density optical disc. Thus, it is necessary to prevent a light beam for DVD that is incident on the region from contributing to spot formation. When the light beam for DVD that is incident on the region dedicated for the high-density optical disc is converged on an information recoding surface of an optical disc, it leads to deterioration of spot performance. However, in Japanese Laid-Open Patent Publication No. 2005-243151, designing that takes into consideration the difference in NA between the optical disc standards, such as limiting convergence of the light beam for DVD that is incident on the region dedicated for the high-density optical disc, is not performed. Therefore, in order to adjust an effective NA, an additional optical component having an aperture limiting function is required, but it is not preferred to provide such a component, since the number of parts and the cost are increased.

SUMMARY OF THE INVENTION

Therefore, an object of the present invention is to provide: an objective lens element that is compatible with at least two types of optical disc standards having different NAs and that controls an effective NA when a light beam for an optical disc standard having a relatively small NA is converged, thereby forming a desired spot; and an optical pickup device including the objective lens element.

The present invention is directed to an objective lens element that has optical function surfaces on an incident side and an exit side, that converges a first incident light beam of a wavelength $\lambda_1$ through a base plate having a thickness $t_1$ to form a spot, and that converges a second incident light beam of a wavelength $\lambda_2$ longer than the wavelength $\lambda_1$ through a base plate having a thickness $t_2$ larger than the thickness $t_1$ to form a spot. At least either one of the optical function surfaces is divided into a first region that includes a rotational symmetry axis and through which the first and second incident light beams that substantially contribute to spot formation pass, and a second region that is a ring-shaped region surrounding the first region and through which only the first incident light beam that substantially contributes to spot formation passes. The first region and the second region are provided with diffraction structures different from each other. The objective lens element satisfies the following conditions.

$$DO11 \times DO12 > 0 \qquad (1)$$

$$DO21 \times DO22 < 0 \qquad (2)$$

Here,

DO11 is the diffraction order of the diffracted light beam having the highest diffraction efficiency among light beams of the wavelength $\lambda_1$ that are diffracted by the diffraction structure on the first region, DO21 is the diffraction order of the diffracted light beam having the highest diffraction efficiency among light beams of the wavelength $\lambda_2$ that are diffracted by the diffraction structure on the first region, DO12 is the diffraction order of the diffracted light beam having the highest diffraction efficiency among light beams of the wavelength $\lambda_1$ that are diffracted by the diffraction structure on the second region, and DO22 is the diffraction order of the diffracted light beam having the highest diffraction efficiency among light beams of the wavelength $\lambda_2$ that are diffracted by the diffraction structure on the second region.

In addition, the present invention is directed to an objective lens element that has optical function surfaces on an incident side and an exit side, that converges a first incident light beam of a wavelength $\lambda_1$ through a base plate having a thickness $t_1$ to form a spot, that converges a second incident light beam of a wavelength $\lambda_2$ longer than the wavelength $\lambda_1$ through a base plate having a thickness $t_2$ larger than the thickness $t_1$ to form a spot, and that converges a third incident light beam of a wavelength $\lambda_3$ longer than the wavelength $\lambda_2$ through a base plate having a thickness $t_3$ larger than the thickness $t_2$ to form a spot. At least either one of the optical function surfaces is divided into a first region that includes a rotational symmetry axis and through which the first to third incident light beams that substantially contribute to spot formation pass, a second region that is a ring-shaped region surrounding the first region and through which only the first and second incident light beams that substantially contribute to spot formation pass, and a third region that is a ring-shaped region surrounding the second region and through which only the first incident light beam that substantially contributes to spot formation passes. The first to third regions are provided with diffraction structures different from each other. The objective lens element satisfies the following conditions.

$$DO12 \times DO13 > 0 \qquad (5)$$

$$DO22 \times DO23 < 0 \qquad (6)$$

Here,

DO12 is the diffraction order of the diffracted light beam having the highest diffraction efficiency among light beams of the wavelength $\lambda_1$ that are diffracted by the diffraction structure on the second region, DO22 is the diffraction order of the diffracted light beam having the highest diffraction efficiency among light beams of the wavelength $\lambda_2$ that are diffracted by the diffraction structure on the second region, DO13 is the diffraction order of the diffracted light beam having the highest diffraction efficiency among light beams of the wavelength $\lambda_1$ that are diffracted by the diffraction structure on the third region, and DO23 is the diffraction order of the diffracted light beam having the highest diffraction efficiency among light beams of the wavelength $\lambda_2$ that are diffracted by the diffraction structure on the third region.

In addition, the present invention is directed to an optical pickup device that converges a first incident light beam of a wavelength $\lambda_1$ through a base plate having a thickness $t_1$ to form a spot and that converges a second incident light beam of a wavelength $\lambda_2$ longer than the wavelength $\lambda_1$ through a base plate having a thickness $t_2$ larger than the thickness $t_1$ to form a spot. The optical pickup device includes: a first light source for emitting a light beam of the wavelength $\lambda_1$; a second light source for emitting a light beam of the wavelength $\lambda_2$; any one of the above-described objective lens elements; and a detection element for detecting a light beam reflected by an information storage medium that is an optical disc.

According to the present invention, when a light beam for an optical disc standard having a small NA is converged, the outermost region exerts an aperture limiting function. Thus, an objective lens element that is compatible with at least two types of optical disc standards having different NAs and that can form a desired spot, and an optical pickup device including the objective lens element can be realized.

These and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
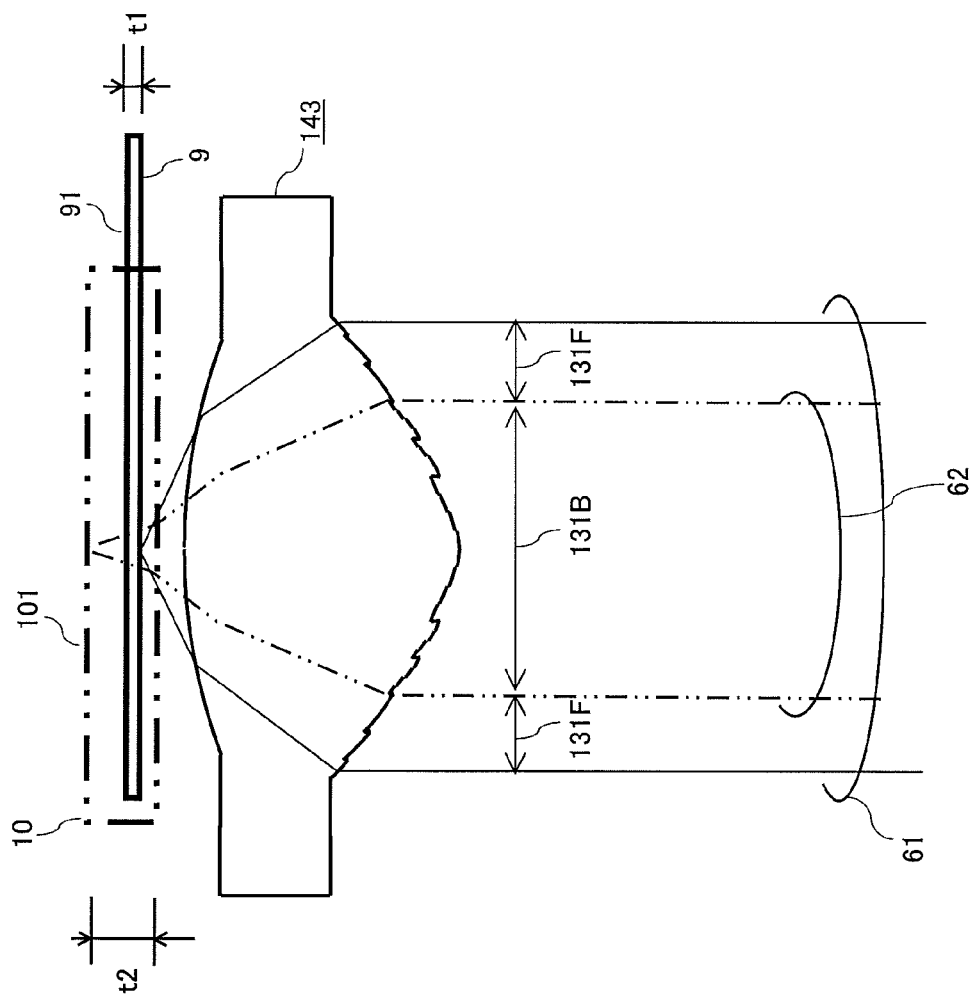
FIG. 1 is a schematic configuration diagram of an objective lens element according to Embodiment 1.

FIG. 1 is a schematic configuration diagram of an objective lens element according to Embodiment 1.

An objective lens element 143 according to Embodiment 1 is compatible with the BD standard (NA=0.85) and the DVD standard (NA=0.65), converges a blue light beam of a wavelength $\lambda_1$ (about 400 nm) on an information recoding surface through a base plate having a thickness of 0.1 mm to form a spot thereon, and converges a red light beam of a wavelength $\lambda_2$ (about 680 nm) on an information recoding surface through a base plate having a thickness of 0.6 min to form a spot thereon. An incident side optical function surface of the objective lens element 143 is divided into an inner part 131B including a rotational symmetry axis (optical axis) and a ring-shaped outer part 131F surrounding the inner part 131B. The inner part 131B is provided with a stair-like diffraction structure that consists of periodic stair-like steps, and the outer part 131F is provided with a sawtooth-like diffraction structure.

Figure 2:
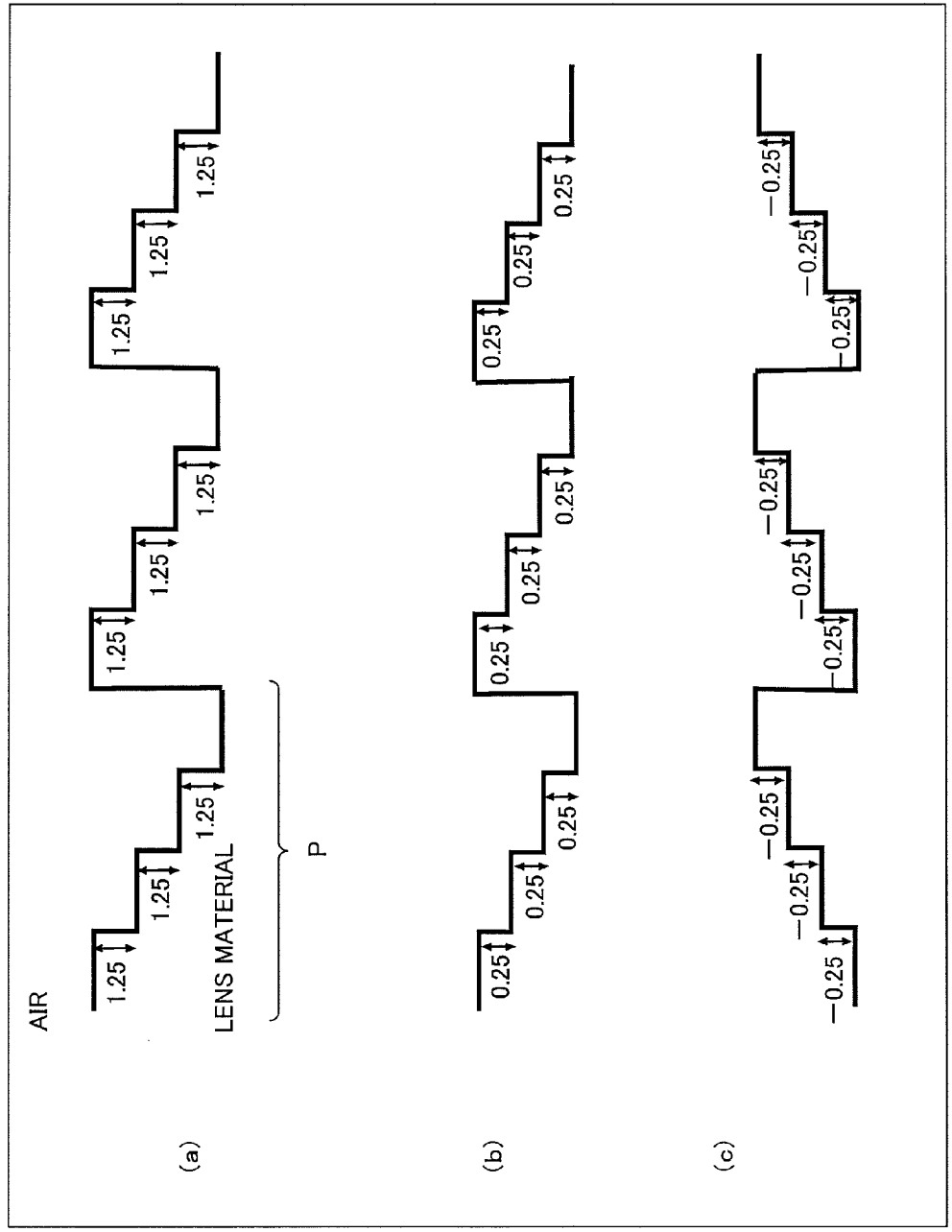
FIG. 2 is a diagram illustrating a stair-like diffraction structure provided on an inner part of the objective lens element shown in FIG. 1.

FIG. 2 is a diagram illustrating the stair-like diffraction structure provided on the inner part of the objective lens element shown in FIG. 1. FIG. 2(a) shows a theoretical shape of the stair-like step structure provided on the optical function surface of the objective lens element. FIG. 2(b) shows an amount of phase change provided to the light beam of the wavelength $\lambda_1$ for BD, and FIG. 2(c) shows an amount of phase change provided to the light beam of the wavelength $\lambda_2$ for DVD.

Figure 3:
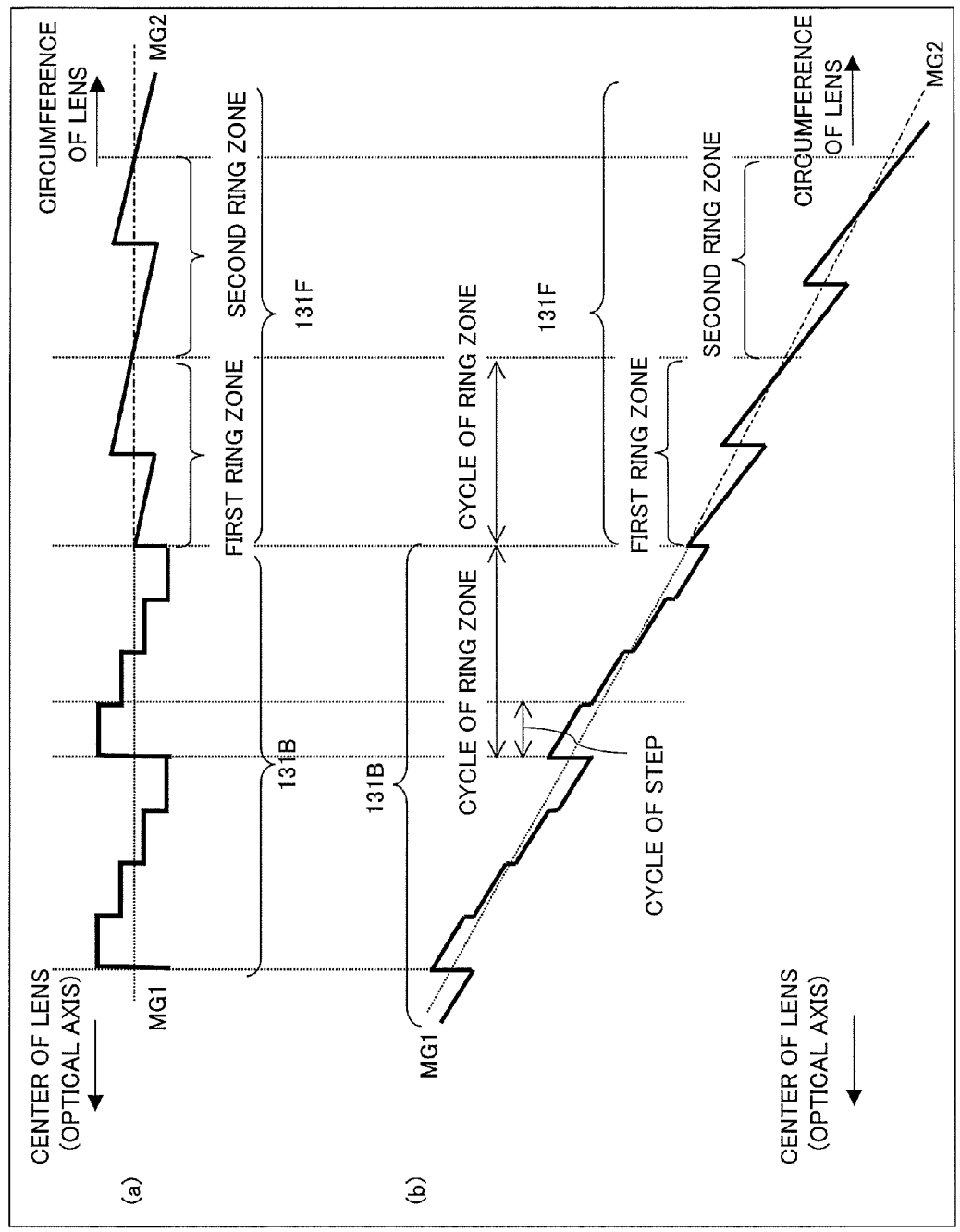
FIG. 3 is a diagram illustrating diffraction structures provided near the boundary between the inner part and an outer part of the objective lens element shown in FIG. 1.

FIG. 3 is a diagram illustrating diffraction structures provided near the boundary between the inner part and the out part of the objective lens element shown in FIG. 1. FIG. 3(a) is a diagram in which a base aspheric surface is removed and only the diffraction structures are provided on a planar surface for easier understanding. FIG. 3(b) is a diagram in which the diffraction structures are provided on the base aspheric surface of the objective lens element.

The stair-like diffraction structure shown in FIG. 2(a) is a periodic structure in which one cycle consists of consecutive 4-level steps. The height of one step is set such that a difference in optical path that is about 1.25 times that of the wavelength $\lambda_1$ is provided to the blue light beam for BD. When the light beam of the wavelength $\lambda_1$ is incident on the stair-like diffraction structure, a phase difference of about 0.25 wavelength (about $\frac{1}{2}\pi$) is provided to the light beam of the wavelength $\lambda_1$ each time the step height is increased by one step, as shown in FIG. 2(b). The diffraction structure for one cycle in FIG. 2(b) can be regarded as a diffraction grating in which 4 steps each providing a phase difference of 0.25 wavelength are consecutively arranged in a stair-like manner. Thus, the diffraction order having the highest diffraction efficiency is +1st order.

Meanwhile, when the light beam of the wavelength $\lambda_2$ is incident on the stair-like diffraction structure shown in FIG. 2(a), one step provides a difference in optical path of about 0.75 wavelength to the light beam of the wavelength $\lambda_2$. Thus, the stair-like diffraction structure provides a phase difference of about -0.25 wavelength (about $-\frac{1}{2}\pi$) to the light beam of the wavelength $\lambda_2$ each time the step height is increased by one step, as shown in FIG. 2(c). When the light beam of the wavelength $\lambda_2$ is used, the stair-like diffraction structure shown in FIG. 2(a) can be regarded as a diffraction grating in which 4 steps each providing a phase difference of -0.25 wavelength are consecutively arranged in a stair-like manner. Thus, the diffraction order having the highest diffraction efficiency is -1st order.

The outer part 131F is a region dedicated for BD, and thus has an aperture limiting function for adjusting an effective NA, with respect to the light beam of the wavelength $\lambda_2$ for DVD. In other words, the outer part 131F is designed such that a light beam of the wavelength $\lambda_2$ incident on the outer part 131F is not converged at a position largely distant from a spot formed by a light beam of the wavelength $\lambda_2$ incident on the inner part 131B and a great defocus component and a great spherical aberration component are generated. In addition, the sawtooth depth is set such that the diffraction efficiency at the outer part 131F which is provided when the light beam of the wavelength $\lambda_2$ is used is lower than that which is provided when the light beam of the wavelength $\lambda_1$ is used.

Specifically, in the objective lens element 143 according to the present embodiment, the step depth is determined such that the diffraction efficiency of a +3rd order diffracted light beam is at its maximum when the light beam of the wavelength $\lambda_1$ for BD is used. In this case, the diffraction order having the highest diffraction efficiency at the wavelength $\lambda_2$ for DVD is +2nd order, but the diffraction efficiency of an +2nd order diffracted light beam is relatively low. In addition, the diffraction order of the light beam of the wavelength $\lambda_1$ is +1st order at the inner part 131B and +3rd order at the outer part 131F, while the diffraction order of the light beam of the wavelength $\lambda_2$ is -1st order at the inner part 131B and +2nd order at the outer part 131F. The power of diffraction provided to the light beam of the wavelength $\lambda_2$ experiences a substantial change from negative to positive. Thus, a great difference in focal point occurs between a light beam having passed through the inner part 131B and a light beam having passed through the outer part 131F, and an amount of a generated spherical aberration is also increased. In this manner, the outer part 131F substantially prevents the incident light beam of the wavelength $\lambda_2$ from contributing to spot formation, and exerts the aperture limiting function.

In another example, the sawtooth-like diffraction structure may be designed such that the diffraction efficiency of a +1st order diffracted light beam among light beams of the wavelength $\lambda_1$ that are diffracted by the outer part 131F is at its maximum. In this case, when the light beam of the wavelength $\lambda_2$ for DVD is used, the diffraction efficiency of a +1st order diffracted light beam is at its maximum, but the diffraction efficiency becomes about +60% at most. In addition, since the diffraction order also experiences a substantial change from -1st order at the inner part 131B to +1st order at the outer part 131F, a difference in focal point and a great spherical aberration occurs. Thus, the outer part 131F can exert the aperture limiting function similarly to the above example.

Here, the objective lens element 143 according to Embodiment 1 satisfies the following conditions (1) and (2).

$$DO11 \times DO12 > 0 \tag{1}$$

$$DO21 \times DO22 < 0 \tag{2}$$

Here,

DO11 is the diffraction order of the diffracted light beam having the highest diffraction efficiency among light beams of the wavelength $\lambda_1$ that are diffracted by the diffraction structure on the inner part, DO21 is the diffraction order of the diffracted light beam having the highest diffraction efficiency among light beams of the wavelength $\lambda_2$ that are diffracted by the diffraction structure on the inner part, DO12 is the diffraction order of the diffracted light beam having the highest diffraction efficiency among light beams of the wavelength $\lambda_1$ that are diffracted by the diffraction structure on the outer part, and DO22 is the diffraction order of the diffracted light beam having the highest diffraction efficiency among light beams of the wavelength $\lambda_2$ that are diffracted by the diffraction structure on the outer part.

The conditions (1) and (2) define sign changes of the diffraction order at the outer part 131F and the diffraction order at the inner part 131B. When the conditions (1) and (2) are satisfied, the diffraction direction of the light beam of the wavelength $\lambda_2$ for DVD can be greatly different between the inner part 131B and the outer part 131F, and the aperture limiting function can be provided to the outer part 131F.

The objective lens element 143 according to Embodiment 1 preferably satisfies the following condition (3).

$$1.5 \leq (DO22/DO12) - (DO21/DO11) \leq 3.0 \quad (3)$$

The condition (3) defines the relation between the diffraction order at the outer part 131F and the diffraction order at the inner part 131B. When the relation is out of the numerical range of the condition (3), the outer part 131F cannot sufficiently exert the aperture limiting function with respect to the light beam of the wavelength $\lambda_2$.

The objective lens element 143 according to Embodiment 1 preferably satisfies the following condition (4).

$$-1.0 \leq (DO22/DO12)/(DO21/DO11) \leq -0.3 \quad (4)$$

The condition (4) defines the relation between the diffraction order at the outer part 131F and the diffraction order at the inner part 131B. In order that the outer part 131F can sufficiently exert the aperture limiting function with respect to the light beam of the wavelength $\lambda_2$, it is preferred to satisfy these conditions.

Table 1 shows combinations of diffraction orders provided by the diffraction structures on the inner part 131B and the outer part 131F. Note that as long as the conditions (1) and (2) are satisfied, the diffraction structures may be designed such that other combinations of diffraction orders are provided.

TABLE 1

| Inner Part | | Outer Part | | Conditions | | | |
|---|---|---|---|---|---|---|---|
| BD | DVD | BD | DVD | | | | |
| DO11 | DO21 | DO12 | DO22 | (1) | (2) | (3) | (4) |
| 1 | −1 | 1 | 1 | 1 | −1 | 2.0 | −1.0 |
| 1 | −1 | 2 | 1 | 2 | −1 | 1.5 | −0.5 |
| 1 | −1 | 3 | 2 | 3 | −2 | 1.7 | −0.7 |
| 1 | −1 | 4 | 2 | 4 | −2 | 1.5 | −0.5 |
| 1 | −1 | 5 | 3 | 5 | −3 | 1.6 | −0.6 |
| 1 | −2 | 1 | 1 | 1 | −2 | 3.0 | −0.5 |
| 1 | −2 | 2 | 1 | 2 | −2 | 2.5 | −0.3 |
| 1 | −2 | 3 | 2 | 3 | −4 | 2.7 | −0.3 |
| 1 | −2 | 4 | 2 | 4 | −4 | 2.5 | −0.3 |
| 1 | −2 | 5 | 3 | 5 | −6 | 2.6 | −0.3 |

Condition (1): DO11 × DO12
Condition (2): DO21 × DO22
Condition (3): (DO22/DO12) − (DO21/DO11)
Condition (4): (DO22/DO12)/(DO21/DO11)

Figure 4:
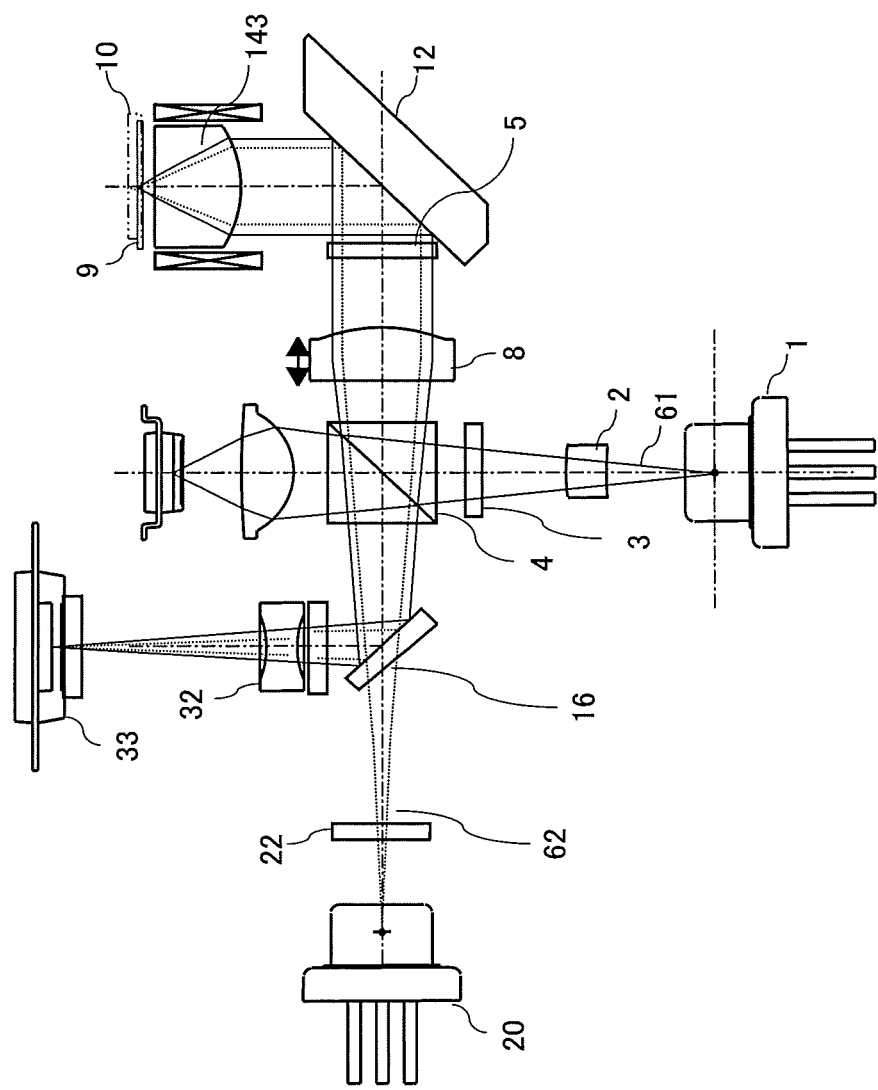
FIG. 4 is a schematic configuration diagram of an optical pickup device including the objective lens element according to Embodiment 1.

FIG. 4 is a schematic configuration diagram of an optical pickup device including the objective lens element according to Embodiment 1. The optical pickup device shown in FIG. 4 is compatible with the two optical disc standards of BD and DVD.

A blue light beam 61 emitted from a laser beam source 1 passes through a relay lens 2, is reflected by a beam splitter 4, and then is converted into a substantially parallel light beam by a collimating lens 8. The collimating lens 8 is movable in an optical axis direction. By moving in the optical axis direction, the collimating lens 8 compensates for a spherical aberration caused by an error of a base material thickness of an optical disc and a difference in base material thickness between information recoding surfaces. The blue light beam 61 having passed through the collimating lens 8 is reflected by an upward reflection mirror 12, enters the objective lens element 143, and is converged on an information recoding surface of an optical disc 9 to form a desired spot thereon. The blue light beam 61 reflected by the information recoding surface of the optical disc 9 passes through the objective lens element 143 again, is reflected by the upward reflection mirror 12, and passes through the collimating lens 8 and the beam splitter 4 in order. The blue light beam 61 outputted from the beam splitter 4 is reflected by a beam splitter 16, is converged on a photodetector 33 by a detection lens 32, and is detected as an optical signal.

A red light beam 62 emitted from a laser beam source 20 passes through the beam splitter 16 and the beam splitter 4, enters the collimating lens 8, and is converted into diffused light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in disc base material thickness, a temperature change, a wavelength change, and the like. The red light beam 62 having passed through the collimating lens 8 is reflected as diverging light by the upward reflection mirror 12, enters the objective lens element 143, and is converged on an information recoding surface of an optical disc 10 to form a desired spot thereon. The red light beam 62 reflected by the information recoding surface of the optical disc 10 passes through the objective lens element 143 again, is reflected by the upward reflection mirror 12, and passes through the collimating lens 8 and the beam splitter 4 in order. The red light beam 62 outputted from the beam splitter 4 is reflected by the beam splitter 16, is converged on the photodetector 33 by the detection lens 32, and is detected as an optical signal.

Since the optical pickup device shown in FIG. 4 includes the objective lens element 143 according to Embodiment 1, the outer part 131F, which is the region dedicated for BD, exerts the aperture limiting function for adjusting the effective NA, when the light beam of the wavelength $\lambda_2$ is used. Thus, in the optical pickup device according to the present embodiment, it is possible to form a desired spot on an optical disc of either standard.

Embodiment 2

Figure 5:
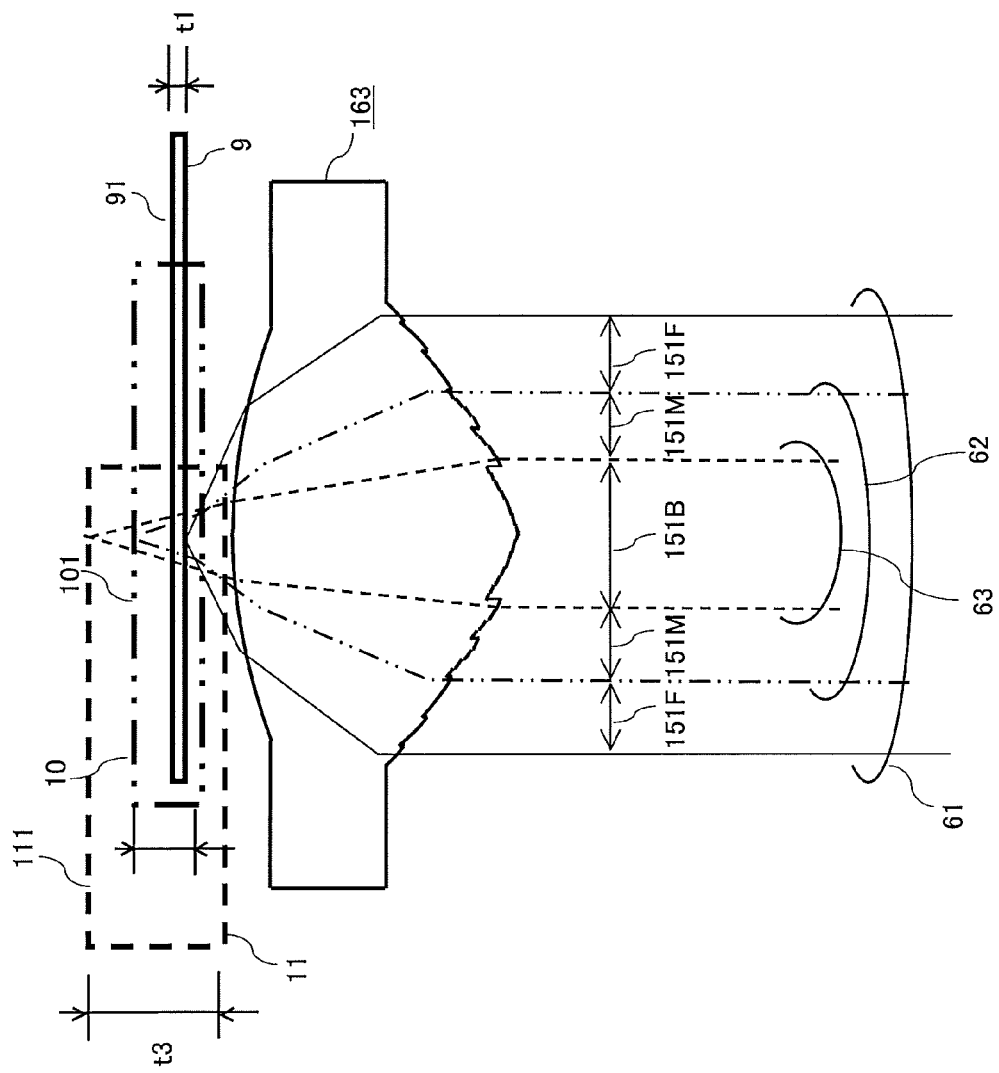
FIG. 5 is a schematic configuration diagram of an objective lens element according to Embodiment 2.

FIG. 5 is a schematic configuration diagram of an objective lens element according to Embodiment 2.

An objective lens element 163 according to Embodiment 2 is compatible with the optical disc standards of BD, DVD, and CD, converges a blue light beam of a wavelength $\lambda_1$ (about 400 nm) on an information recoding surface through a base plate having a thickness of 0.1 mm to form a spot thereon, converges a red light beam of a wavelength $\lambda_2$ (about 680 nm) on an information recoding surface through a base plate having a thickness of 0.6 mm to form a spot thereon, and converges an infrared light beam of a wavelength $\lambda_3$ (about 780 nm) on an information recoding surface through a base plate having a thickness of 1.2 mm to form a spot thereon.

An incident side optical function surface of the objective lens element 163 is divided into three regions each having a center at a symmetry axis (optical axis), namely, an inner part 151B including the symmetry axis, a ring-shaped intermediate part 151M surrounding the inner part 151B, and a ring-shaped outer part 151F surrounding the intermediate part 151M. The inner part 151B is provided with a stair-like diffraction structure, the intermediate part 151M is provided with a stair-like diffraction structure different from that on the inner part 151B, and the outer part 151F is provided with a sawtooth-like diffraction structure.

Figure 6:
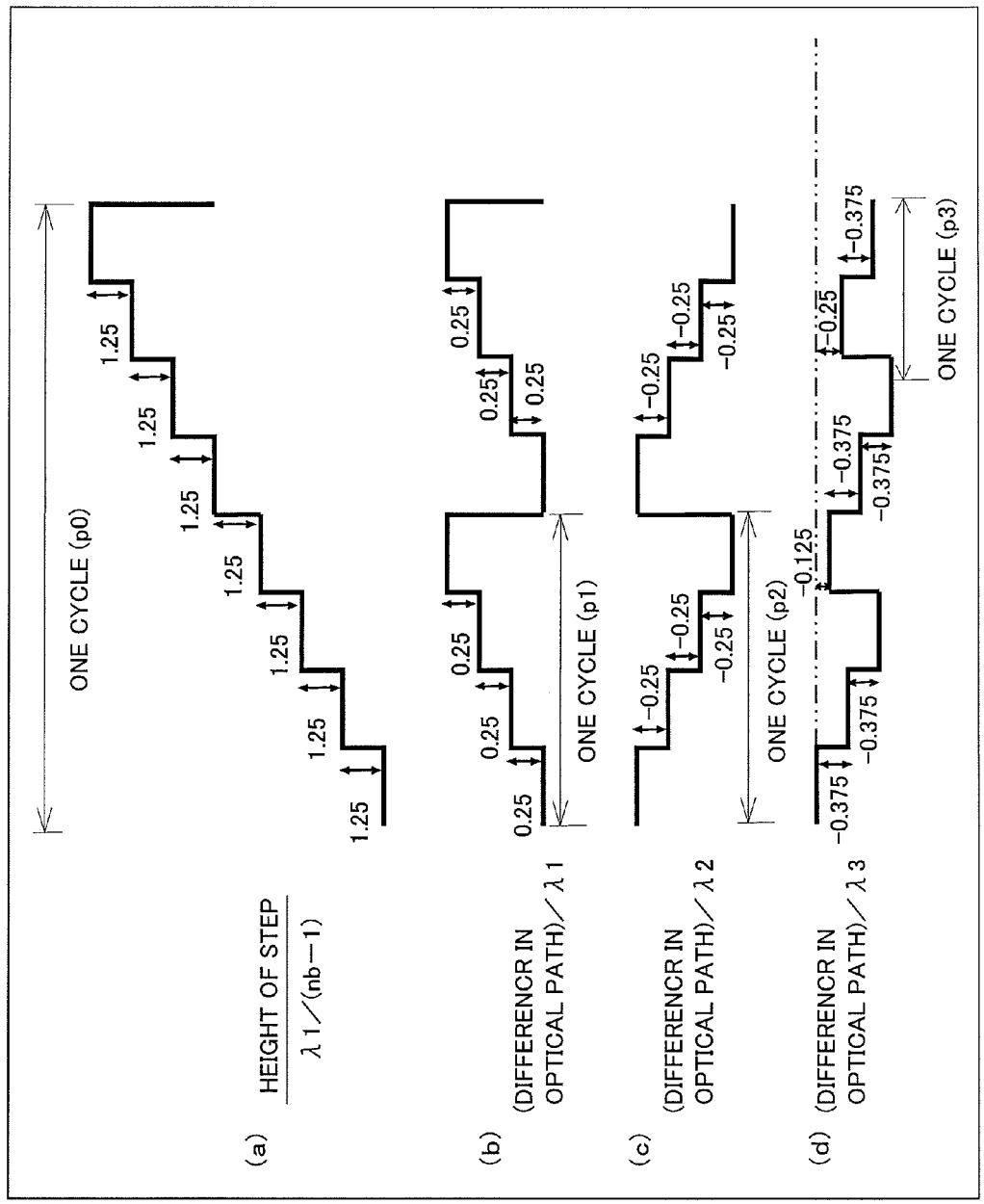
FIG. 6 is a diagram illustrating a stair-like diffraction structure provided on an inner part of the objective lens element shown in FIG. 5.

FIG. 6 is a diagram illustrating the stair-like diffraction structure provided on the inner part of the objective lens element shown in FIG. 5. FIG. 6(a) shows a theoretical shape of the stair-like step structure provided on the optical function surface of the objective lens element. FIG. 6(b) shows an amount of phase change provided to the light beam of the wavelength $\lambda_1$ for BD, FIG. 6(c) shows an amount of phase change provided to the light beam of the wavelength $\lambda_2$ for DVD, and FIG. 6(d) shows an amount of phase change provided to the light beam of the wavelength $\lambda_3$ for CD.

Figure 7:
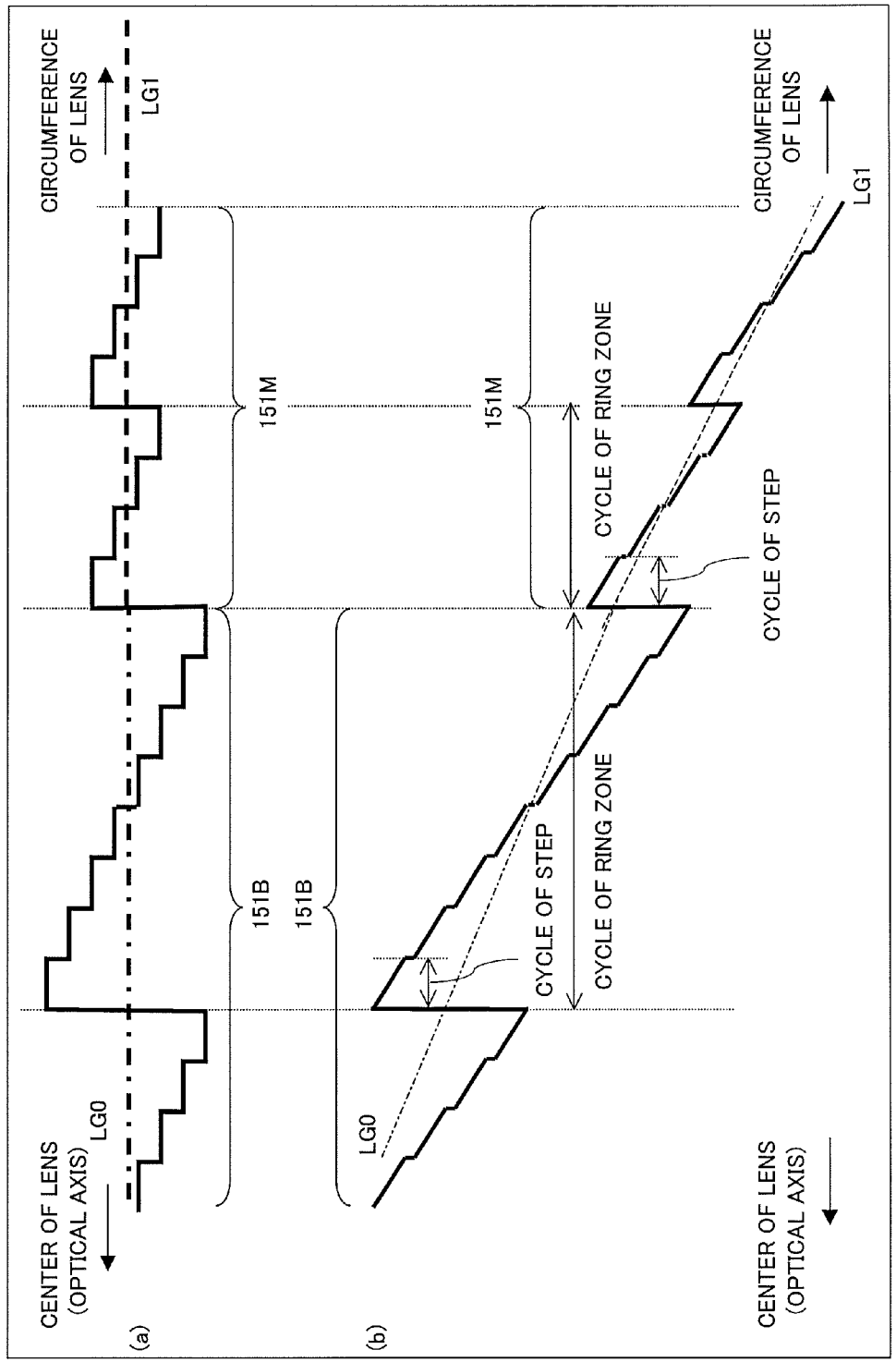
FIG. 7 is a diagram illustrating diffraction structures provided near the boundary between the inner part and an intermediate part of the objective lens element shown in FIG. 5.

FIG. 7 is a diagram illustrating diffraction structures provided near the boundary between the inner part and the intermediate part of the objective lens element shown in FIG. 5. FIG. 7(a) is a diagram in which a base aspheric surface is removed and only the diffraction structures are provided on a planar surface for easier understanding. FIG. 7(b) is a diagram in which the diffraction structures are provided on the base aspheric surface of the objective lens element.

The inner part 151B is a region shared by the light beams of the three wavelengths for BD, DVD, and CD. The stair-like diffraction structure provided on the inner part 151B is a periodic structure in which one cycle consists of 8-level steps whose height is monotonically increased step by step. The height of one step is set such that a difference in optical path that is about 1.25 times as long as the wavelength $\lambda_1$ is provided to the blue light beam for BD. When the light beam of the wavelength $\lambda_1$ is incident on the stair-like diffraction structure, a phase difference of about 0.25 wavelength (about $\frac{1}{2}\pi$) is provided to the light beam of the wavelength $\lambda_1$ each time the step height is increased by one step. When the light beam of the wavelength $\lambda_1$ is used, the stair-like diffraction structure in FIG. 6(a) can be regarded as a diffraction grating in which 4 steps each providing a phase difference of 0.25 wavelength are consecutively arranged in a stair-like manner, as shown in FIG. 6(b). Thus, the diffraction order having the highest diffraction efficiency is +2nd order.

In addition, when the light beam of the wavelength $\lambda_2$ is incident on the stair-like diffraction structure shown in FIG. 6(a), one step provides a difference in optical path of about 0.75 wavelength to the light beam of the wavelength $\lambda_2$. Thus, the stair-like diffraction structure provides a phase difference of about −0.25 wavelength (about −$\frac{1}{2}\pi$) to the light beam of the wavelength $\lambda_2$ each time the step height is increased by one step, as shown in FIG. 6(c). When the light beam of the wavelength $\lambda_2$ is used, the stair-like diffraction structure shown in FIG. 6(a) can be regarded as a diffraction grating in which 4 steps each providing a phase difference of −0.25 wavelength are consecutively arranged in a stair-like manner. Thus, the diffraction order having the highest diffraction efficiency is −2nd order.

Moreover, when the light beam of the wavelength $\lambda_3$ is incident on the stair-like diffraction structure shown in FIG. 6(a), one step provides a difference in optical path of about 0.625 wavelength to the light beam of the wavelength $\lambda_3$. Thus, the stair-like diffraction structure provides a phase difference of about −0.375 wavelength to the light beam of the wavelength $\lambda_3$ each time the step height is increased by one step, as shown in FIG. 6(d). When the light beam of the wavelength $\lambda_3$ is used, substantially 3 steps each providing a phase difference of −0.375 wavelength can be regarded as one diffraction grating, in the stair-like diffraction structure shown in FIG. 6(a). Thus, the diffraction order having the highest diffraction efficiency is −3rd order.

One cycle of the stair-like diffraction structure provided on the inner part 151B does not necessarily need to consist of 8-level steps, and may consist of 5-, 6-, 7-, or 9-level steps.

The intermediate part 151M is a region shared by the light beams of the two wavelengths for BD and DVD. The stair-like diffraction structure provided on the intermediate part 151M is a periodic structure in which one cycle consists of 4-level steps whose height is monotonically increased step by step. The height of one step is set such that a difference in optical path that is about 1.25 times as long as the wavelength $\lambda_1$ is provided to the light beam of the wavelength $\lambda_1$ for BD. Thus, the diffraction efficiency of a +1st order diffracted light beam is at its maximum when the blue light beam of the wavelength $\lambda_1$ is used, and the diffraction efficiency of a −1st order diffracted light beam is at its maximum when the red light beam of the wavelength $\lambda_2$ is used. An infrared light beam for CD incident on the intermediate part 151M diffuses without contributing to a spot and entering a photodetector as stray light. In other words, the intermediate part 151M exerts an aperture limiting function with respect to the light beam of the wavelength $\lambda_3$ for CD. One cycle of the stair-like diffraction structure provided on the intermediate part 151M does not necessarily need to consist of 4-level steps, and may consist of steps other than 4-level steps.

The outer part 151F is a region dedicated for BD, and thus has an aperture limiting function for adjusting an effective NA, with respect to the light beam of the wavelength $\lambda_2$ for DVD and the light beam of the wavelength $\lambda_3$ for CD. In other words, the outer part 151F is designed such that a light beam of the wavelength $\lambda_2$ incident on the outer part 151F is not converged at a position largely distant from a spot formed by a light beam of the same wavelength incident on the inner part 151B and a great defocus component and a great spherical aberration component are generated. In addition, the sawtooth depth is set such that the diffraction efficiency at the outer part 151F which is provided when the light beam of the wavelength $\lambda_2$ or $\lambda_3$ is used is lower than that which is provided when the light beam of the wavelength $\lambda_1$ is used.

Specifically, in the objective lens element 163 according to the present embodiment, the step depth is determined such that the diffraction efficiency of a +3rd order diffracted light beam is at its maximum when the light beam of the wavelength $\lambda_1$ for BD is used. In this case, the diffraction order having the highest diffraction efficiency among diffracted light beams of the wavelength $\lambda_2$ for DVD and the diffraction order having the highest diffraction efficiency among diffracted light beams of the wavelength $\lambda_3$ for CD are +2nd order. In addition, the diffraction efficiency of the +2nd order diffracted light beam of the wavelength $\lambda_2$ and the diffraction efficiency of the +2nd order diffracted light beam of the wavelength $\lambda_3$ are about 84% and about 40%, respectively, and are lower than the diffraction efficiency of the light beam of the wavelength $\lambda_1$ for BD.

The diffraction order of the light beam of the wavelength $\lambda_1$ for BD is +2nd order at the inner part 151B, +1st order at the intermediate part 151M, and +3rd order at the outer part 151F. Thus, the phase gently increases and decreases. Thus, when a BD is used, light beams incident on the inner part 151B, the intermediate part 151M, and the outer part 151F can form a desired spot.

The diffraction order of the light beam of the wavelength $\lambda_2$ for DVD is −2nd order at the inner part 151B and −1st order at the intermediate part 151M, and the phase gently changes. Thus, when a DVD is used, light beams incident on the inner part 151B and the intermediate part 151M can form a desired spot. Here, the diffraction order of a light beam of the wavelength $\lambda_2$ that is diffracted by the outer part 151F is +2nd order. The power caused by diffraction experiences a substantial change from negative to positive over the inner part 151B to the outer part 151F, and thus a convergence spot from the outer part 151F is displaced from a convergence spot from the intermediate part 151M to cause a difference in focal point of about 0.17 mm. In addition, since the diffraction order experiences a substantial change from −1st order to +2nd order, a great spherical aberration occurs. When a DVD is used, the outer part 151F substantially prevents the incident light beam of the wavelength $\lambda_2$ from contributing to spot formation, and exerts the aperture limiting function.

The diffraction order of the light beam of the wavelength $\lambda_3$ for CD is −3rd order at the inner part 151B and −1st order at the intermediate part 151M, but the change rates of these diffraction orders are different from that of the light beam of the wavelength $\lambda_1$ for BD. Thus, the light beam incident on the intermediate part 151M does not contribute to desired spot formation. In addition, in the case of the stair-like diffraction structure in which one cycle consists of 4 steps, the diffraction efficiency of the light beam of the wavelength $\lambda_3$ is about 35%, and the intensity of the diffracted light beam is low. In this manner, when a CD is used, the intermediate part 151M has a sufficient aperture limiting function with respect to the incident light beam of the wavelength $\lambda_3$. Further, the diffraction order of the light beam of the wavelength $\lambda_3$ that is diffracted by the outer part 151F is +2nd order. The power caused by diffraction changes from negative to positive over the intermediate part 151M to the outer part 151F, and thus a convergence spot from the outer part 151F is displaced from a convergence spot from the intermediate part 151M to cause a difference in focal point. In addition, since the diffraction order experiences a substantial change from −1st order to +2nd order, a great spherical aberration occurs. Therefore, when a CD is used, the outer part 151F also substantially prevents the incident light beam of the wavelength $\lambda_3$ from contributing to spot formation, and exerts the aperture limiting function.

In another example, the sawtooth-like diffraction structure may be designed such that the diffraction efficiency of a +1st order diffracted light beam among light beams of the wavelength $\lambda_1$ that are diffracted by the outer part 151F is at its maximum. In this case, when the light beam of the wavelength $\lambda_2$ for DVD or the light beam of the wavelength $\lambda_3$ for CD is used, the diffraction efficiency of a +1st order diffracted light beam is at its maximum. However, the diffraction efficiency of the light beam of the wavelength $\lambda_2$ becomes about +60% at most, and the diffraction efficiency of the light beam of the wavelength $\lambda_3$ becomes about +42% at most. In addition, in either one of the cases of a DVD and a CD, since the diffraction order also experiences a substantial change from −1st order at the inner part 151B to the +1st order at the outer part 151F, a difference in focal point and a great spherical aberration occurs. Thus, the outer part 151F can exert the aperture limiting function similarly to the above example.

Here, the objective lens element 163 according to Embodiment 2 satisfies the following conditions (5) and (6).

$$DO12 \times DO13 > 0 \quad (5)$$

$$DO22 \times DO23 < 0 \quad (6)$$

Here,

DO12 is the diffraction order of the diffracted light beam having the highest diffraction efficiency among light beams of the wavelength $\lambda_1$ that are diffracted by the diffraction structure on the intermediate part, DO22 is the diffraction order of the diffracted light beam having the highest diffraction efficiency among light beams of the wavelength $\lambda_2$ that are diffracted by the diffraction structure on the intermediate part, DO13 is the diffraction order of the diffracted light beam having the highest diffraction efficiency among light beams of the wavelength $\lambda_1$ that are diffracted by the diffraction structure on the outer part, and DO23 is the diffraction order of the diffracted light beam having the highest diffraction efficiency among light beams of the wavelength $\lambda_2$ that are diffracted by the diffraction structure on the outer part.

The conditions (5) and (6) define sign changes of the diffraction order at the outer part 151F and the diffraction order at the intermediate part 151M. When the conditions (5) and (6) are satisfied, the diffraction direction of the light beam of the wavelength $\lambda_2$ for DVD can be greatly different between the inner part 151B and the outer part 151F, and the aperture limiting function can be provided to the outer part 151F.

The objective lens element 163 according to Embodiment 2 satisfies the following condition (7) in addition to the conditions (5) and (6).

$$DO32 \times DO33 < 0 \quad (7)$$

Here,

DO32 is the diffraction order of the diffracted light beam having the highest diffraction efficiency among light beams of the wavelength $\lambda_3$ that are diffracted by the diffraction structure on the intermediate part, and DO33 is the diffraction order of the diffracted light beam having the highest diffraction efficiency among light beams of the wavelength $\lambda_3$ that are diffracted by the diffraction structure on the outer part.

Further, the condition (7) defines sign changes of the diffraction order at the outer part 151F and the diffraction order at the intermediate part 151M. When the condition (7) is satisfied, the diffraction direction of the light beam of the wavelength $\lambda_3$ for CD can be greatly different between the inner part 151B and the outer part 151F, and the aperture limiting function can be provided to the outer part 151F.

The objective lens element 163 according to Embodiment 2 preferably satisfies the following condition (8).

$$1.5 \leq (DO23/DO13) - (DO22/DO12) \leq 3.0 \quad (8)$$

The objective lens element 163 according to Embodiment 2 preferably satisfies the following condition (9).

$$-1.0 \leq (DO23/DO13)/(DO22/DO12) \leq -0.3 \quad (9)$$

The objective lens element 163 according to Embodiment 2 preferably satisfies the following condition (10).

$$1.5 \leq (DO33/DO13) - (DO32/DO12) \leq 3.0 \quad (10)$$

Further, the objective lens element 163 according to Embodiment 2 preferably satisfies the following condition (11).

$$-3.0 \leq (DO33/DO13)/(DO32/DO12) \leq -1.0 \quad (11)$$

The conditions (8) to (11) define the relation between the diffraction order at the outer part 151F and the diffraction order at the intermediate part 151M. In order that the outer part 151F can sufficiently exert the aperture limiting function with respect to the light beams of the wavelengths $\lambda_2$ and $\lambda_3$, it is preferred to satisfy these conditions.

Table 2 shows combinations of diffraction orders provided by the diffraction structures in the inner part 151B, the intermediate part 151M, and the outer part 151F. Note that as long as the conditions (5) to (7) are satisfied, the diffraction structures may be designed such that other combinations of diffraction orders are provided.

TABLE 2

| Inner Part | | | Intermediate Part | | | Outer Part | | | Conditions | | | |
|---|---|---|---|---|---|---|---|---|---|---|---|---|
| BD | DVD | CD | BD | DVD | CD | BD | DVD | CD | | | | |
| DO11 | DO21 | DO31 | DO12 | DO22 | DO32 | DO13 | DO23 | DO33 | (5) | (6) | (7) | (8) |
| 2 | −2 | −3 | 1 | −1 | −1 | 1 | 1 | 1 | 1 | −1 | −1 | 2.0 |
| 2 | −2 | −3 | 1 | −1 | −1 | 2 | 1 | 1 | 2 | −1 | −1 | 1.5 |
| 2 | −2 | −3 | 1 | −1 | −1 | 3 | 2 | 2 | 3 | −2 | −2 | 1.7 |
| 2 | −2 | −3 | 1 | −1 | −1 | 4 | 2 | 2 | 4 | −2 | −2 | 1.5 |
| 2 | −2 | −3 | 1 | −1 | −1 | 5 | 3 | 2 | 5 | −3 | −2 | 1.6 |
| 1 | −2 | −3 | 1 | −1 | −1 | 1 | 1 | 1 | 1 | −1 | −1 | 2.0 |
| 1 | −2 | −3 | 1 | −1 | −1 | 2 | 1 | 1 | 2 | −1 | −1 | 1.5 |
| 1 | −2 | −3 | 1 | −1 | −1 | 3 | 2 | 2 | 3 | −2 | −2 | 1.7 |
| 1 | −2 | −3 | 1 | −1 | −1 | 4 | 2 | 2 | 4 | −2 | −2 | 1.5 |
| 1 | −2 | −3 | 1 | −1 | −1 | 5 | 3 | 2 | 5 | −3 | −2 | 1.6 |

| Inner Part | | | Intermediate Part | | | Outer Part | | | Conditions | | |
|---|---|---|---|---|---|---|---|---|---|---|---|
| BD | DVD | CD | BD | DVD | CD | BD | DVD | CD | | | |
| DO11 | DO21 | DO31 | DO12 | DO22 | DO32 | DO13 | DO23 | DO33 | (9) | (10) | (11) |
| 2 | −2 | −3 | 1 | −1 | −1 | 1 | 1 | 1 | −1.0 | 2.0 | −1.0 |
| 2 | −2 | −3 | 1 | −1 | −1 | 2 | 1 | 1 | −0.5 | 1.5 | −0.5 |
| 2 | −2 | −3 | 1 | −1 | −1 | 3 | 2 | 2 | −0.7 | 1.7 | −0.7 |
| 2 | −2 | −3 | 1 | −1 | −1 | 4 | 2 | 2 | −0.5 | 1.5 | −0.5 |
| 2 | −2 | −3 | 1 | −1 | −1 | 5 | 3 | 2 | −0.6 | 1.4 | −0.4 |
| 1 | −2 | −3 | 1 | −1 | −1 | 1 | 1 | 1 | −1.0 | 2.0 | −1.0 |
| 1 | −2 | −3 | 1 | −1 | −1 | 2 | 1 | 1 | −0.5 | 1.5 | −0.5 |
| 1 | −2 | −3 | 1 | −1 | −1 | 3 | 2 | 2 | −0.7 | 1.7 | −0.7 |
| 1 | −2 | −3 | 1 | −1 | −1 | 4 | 2 | 2 | −0.5 | 1.5 | −0.5 |
| 1 | −2 | −3 | 1 | −1 | −1 | 5 | 3 | 2 | −0.6 | 1.4 | −0.4 |

Condition (5): DO11 × DO13
Condition (6): DO22 × DO23
Condition (7): DO32 × DO23
Condition (8): (DO23/DO13) − (DO22/DO12)
Condition (9): (DO23/DO13)/(DO22/DO12)
Condition (10): (DO33/DO13) − (DO32/DO12)
Condition (11): (DO33/DO13)/(DO32/DO12)

Figure 8:
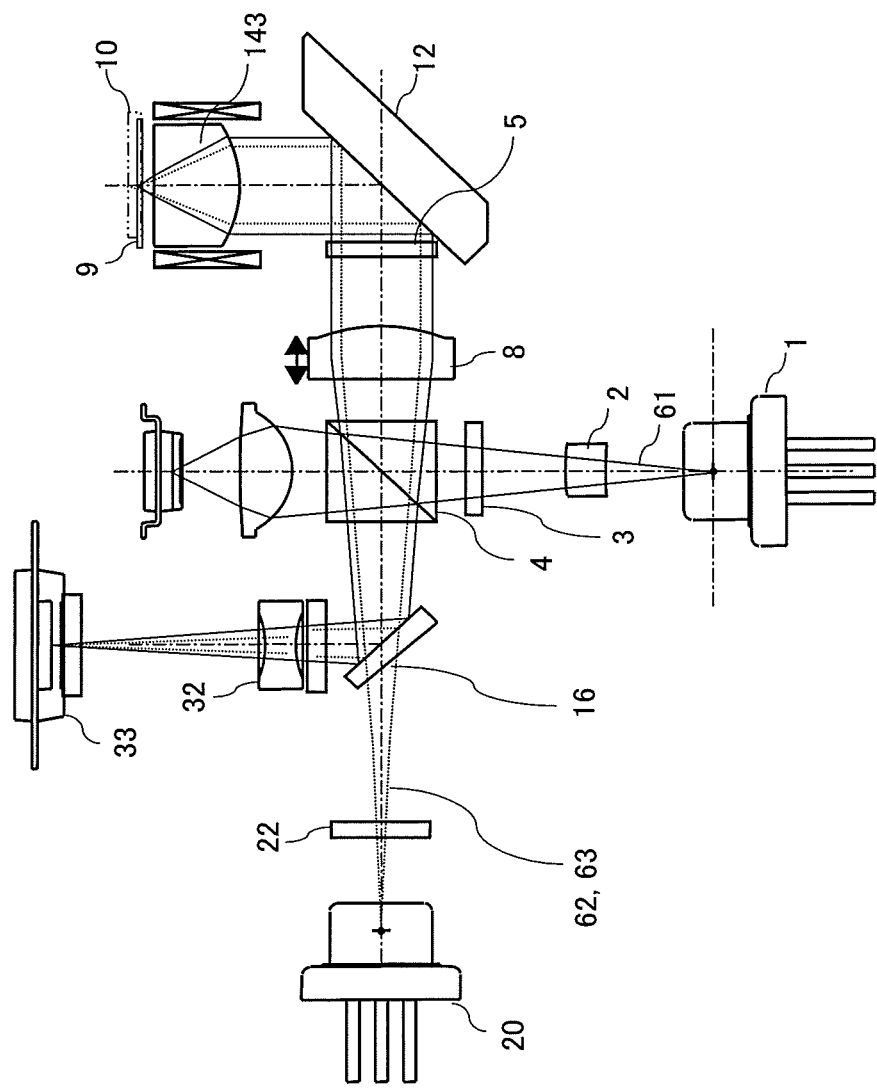
FIG. 8 is a schematic configuration diagram of an optical pickup device including the objective lens element according to Embodiment 2.

FIG. 8 is a schematic configuration diagram of an optical pickup device including the objective lens element according to Embodiment 2. The optical pickup device shown in FIG. 8 is compatible with the three optical disc standards of BD, DVD, and CD.

A blue light beam 61 emitted from a laser beam source 1 passes through a relay lens 2, is reflected by a beam splitter 4, and then is converted into a substantially parallel light beam by a collimating lens 8. The collimating lens 8 is movable in an optical axis direction. By moving in the optical axis direction, the collimating lens 8 compensates for a spherical aberration caused by an error of a base material thickness of an optical disc and a difference in base material thickness between information recoding surfaces. The blue light beam 61 having passed through the collimating lens 8 is reflected by an upward reflection mirror 12, enters the objective lens element 163, and is converged on an information recoding surface of an optical disc 9 to form a desired spot thereon. The blue light beam 61 reflected by the information recoding surface of the optical disc 9 passes through the objective lens element 163 again, is reflected by the upward reflection mirror 12, and passes through the collimating lens 8 and the beam splitter 4 in order. The blue light beam 61 outputted from the beam splitter 4 is reflected by a beam splitter 16, is converged on a photodetector 33 by a detection lens 32, and is detected as an optical signal.

A laser beam source according to the present embodiment is a two-wavelength laser beam source that selectively emits a red light beam and an infrared light beam. A red light beam 62 emitted from a laser beam source 20 passes through the beam splitter 16 and the beam splitter 4, enters the collimating lens 8, and is converted into diffused light. The collimating lens 8 can adjust the parallelism of the red light beam 62 by moving in the optical axis direction. In addition, similarly to the case where the optical disc 9 is used, by moving in the optical axis direction, the collimating lens 8 compensates for a spherical aberration caused by a difference in disc base material thickness, a temperature change, a wavelength change, and the like. The red light beam 62 having passed through the collimating lens 8 is reflected as diverging light by the upward reflection mirror 12, enters the objective lens element 163, and is converged on an information recoding surface of an optical disc 10 to form a desired spot thereon.

The red light beam 62 reflected by the information recoding surface of the optical disc 10 passes through the objective lens element 163 again, is reflected by the upward reflection mirror 12, and passes through the collimating lens 8 and the beam splitter 4 in order. The red light beam 62 outputted from the beam splitter 4 is reflected by the beam splitter 16, is converged on the photodetector 33 by the detection lens 32, and is detected as an optical signal.

An infrared light beam 63 emitted from the laser beam source 20 passes through the beam splitter 16 and the beam splitter 4, enters the collimating lens 8, and is converted into diffused light. The infrared light beam 63 outputted from the collimating lens 8 is reflected by the upward reflection mirror 12, enters the objective lens element 163, and is converged on an information recoding surface of an optical disc 11 to form a desired spot thereon. The infrared light beam 63 reflected by the information recoding surface of the optical disc 11 passes through the objective lens element 163 again, is reflected by the upward reflection mirror 12, passes through the collimating lens 8 and the beam splitter 4 in order, and is reflected by the beam splitter 16. Then, the infrared light beam 63 is converged by the detection lens 32 and detected as an optical signal by the photodetector 33.

Since the optical pickup device shown in FIG. 8 includes the objective lens 163 according to Embodiment 2, the outer part 151F, which is the region dedicated for BD, exerts the aperture limiting function for adjusting the effective NA, when the light beam of the wavelength $\lambda_2$ or $\lambda_3$ is used. Thus, in the optical pickup device according to the present embodiment, it is possible to form a desired spot on an optical disc of any one of the standards.

EXAMPLES

Hereinafter, Numerical Examples of the present invention will be specifically described with construction data, aberration diagrams, and the like. Note that in each Numerical Example, a surface to which an aspheric coefficient is provided indicates a refractive optical surface having an aspherical shape or a surface (e.g., a diffractive surface) having a refraction function equal to that of an aspheric surface. The surface shape of an aspheric surface is defined by the following equation.

$$X = \frac{C_j h^2}{1 + \sqrt{1 - (1+k_j)C_j^2 h^2}} + \sum A_{j,n} h^n$$

Here,
X is the distance from an on-the-aspheric-surface point at a height h relative to the optical axis to a tangential plane at the top of the aspheric surface,
h is the height relative to the optical axis,
$C_j$ is the radius of curvature at the top of an aspheric surface of a lens jth surface ($C_j=1/R_j$),
$K_j$ is the conic constant of the lens jth surface, and
$A_{j,n}$ is the nth-order aspheric constant of the lens jth surface.

Further, a phase difference caused by a diffraction structure added to an optical surface is provided by the following equation.

$$\Phi(h) = \Sigma P_{j,m} h^{2m}$$

Here,
$\Phi(h)$ is a phase function,
h is the height relative to the optical axis, and
$P_{j,m}$ is the 2mth-order phase function coefficient of the lens jth surface.

Numerical Example 1

Numerical Example 1 corresponds to Embodiment 1. A first surface of an objective lens element according to Numerical Example 1 is divided into an inner part including a symmetry axis and an outer part surrounding the inner part. The inner part of the first surface is provided with a stair-like diffraction structure, and the outer part is provided with a sawtooth-like diffraction structure. A second surface of the objective lens element is also divided into an inner part and an outer part that consist of different aspheric surfaces, respectively. The objective lens element according to Numerical Example 1 is a BD/DVD compatible lens. With regard to designed values for BD, the wavelength is 408 nm; the focal length is 2.24 mm; the numerical aperture (NA) is 0.86; and the protective layer thickness of an information storage medium is 0.1 mm. With regard to designed values for DVD, the wavelength is 658 nm; the focal length is 1.74 mm; the NA is 0.6; and the protective layer thickness of an information storage medium is 0.6 mm.

Tables 3 and 4 show construction data of the objective lens element according to Numerical Example 1.

TABLE 3

|  | BD | DVD |
| --- | --- | --- |
| Wavelength | 0.408 | 0.658 |
| Diameter of aperture | 2.24 | 1.74 |
| NA | 0.86 | 0.6 |
| Working distance (WD) | 0.4 | 0.3 |
| Disc thickness (DT) | 0.1 | 0.6 |
| Focal length | 1.3 | 1.4 |
| Diffraction order of inner part of the first surface | 2 | −2 |
| Diffraction order of outer part of the first surface | 3 | — |
| Object point (OP) | ∞ | 100 |

| Surface No. | Radius of curvature at the top | Thickness | Material | Remarks column |
| --- | --- | --- | --- | --- |
| 0 |  | OP |  | Inner part (diffractive surface) |
|  |  |  |  | Outer part (diffractive surface) |
| 1 | 0.8623596 | 1.53761 | n1 | Inner part (aspheric surface) |
|  |  |  |  | Outer part (aspheric surface) |
| 2 | −1.4180252 | WD |  |  |
| 3 | ∞ | DT | disk | Plane |
| 4 | ∞ |  |  | Plane |

| Wavelength | 0.408 | 0.658 |
| --- | --- | --- |
| n1 | 1.52183 | 1.50399 |
| disk | 1.61642 | 1.57829 |

TABLE 4

| First surface | Inner part Diffractive surface |
| --- | --- |
|  | Diffractive surface |
| Region | 0 mm-0.875 mm |
|  | Aspheric constant |
| RD | 0.8623596 |
| k | −0.60941585 |
| A0 | 0 |
| A2 | 0 |
| A4 | 0.030312057 |
| A6 | 0.007903167 |
| A8 | 0.033434594 |
| A10 | −0.040242123 |
| A12 | 0.03565307 |
| A14 | 0 |
| A16 | 0 |

TABLE 4-continued

| First surface | Inner part<br>Phase function<br>Diffractive surface |
|---|---|
| P2 | −252.69918 |
| P4 | 19.488719 |
| P6 | −6.0774978 |

| First surface | Outer part<br>Diffractive surface |
|---|---|
| | Diffractive surface |
| Region | 0.875 mm-1.135 mm<br>Aspheric constant |
| RD | 0.88626293 |
| k | −0.56324572 |
| A0 | −0.000783721 |
| A2 | 0 |
| A4 | 0.02841522 |
| A6 | 0.024092703 |
| A8 | 0.014300394 |
| A10 | 0.005422059 |
| A12 | −0.001226095 |
| A14 | −0.006152124 |
| A16 | −0.010042872 |

| First surface | Outer part<br>Phase function<br>Diffractive surface |
|---|---|
| P2 | −94.238879 |
| P4 | −4.7829869 |
| P6 | −5.4908529 |

| Second surface | Inner part |
|---|---|
| | Diffractive surface |
| Region | 0 mm-0.53 mm<br>Aspheric constant |
| RD | −1.4180252 |
| k | −23.75474 |
| A0 | 0 |
| A2 | 0 |
| A4 | 0.35949876 |
| A6 | −0.28463298 |
| A8 | −3.2713988 |
| A10 | 19.065115 |
| A12 | −33.47043 |

| Second surface | Outer part |
|---|---|
| | Diffractive surface |
| Region | 0.53 mm-0.88 mm<br>Aspheric constant |
| RD | −2.718803 |
| k | −100.84377 |
| A0 | −0.014784807 |
| A2 | 0 |
| A4 | 0.020787673 |
| A6 | −0.032165463 |
| A8 | −0.072879952 |
| A10 | −0.019240323 |
| A12 | 0.10525242 |
| A14 | 0.13019095 |
| A16 | −0.17951674 |

Figure 9:
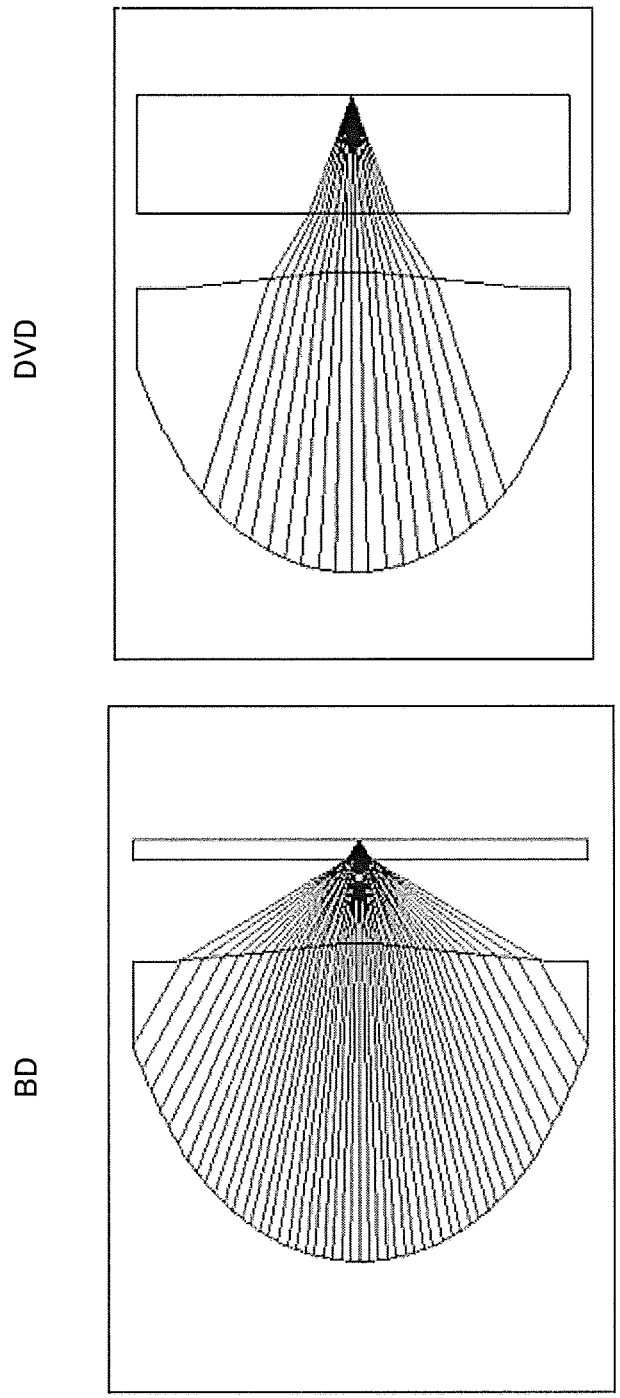
FIG. 9 is an optical path diagram of an objective lens element according to Numerical Example 1.
Figure 10:
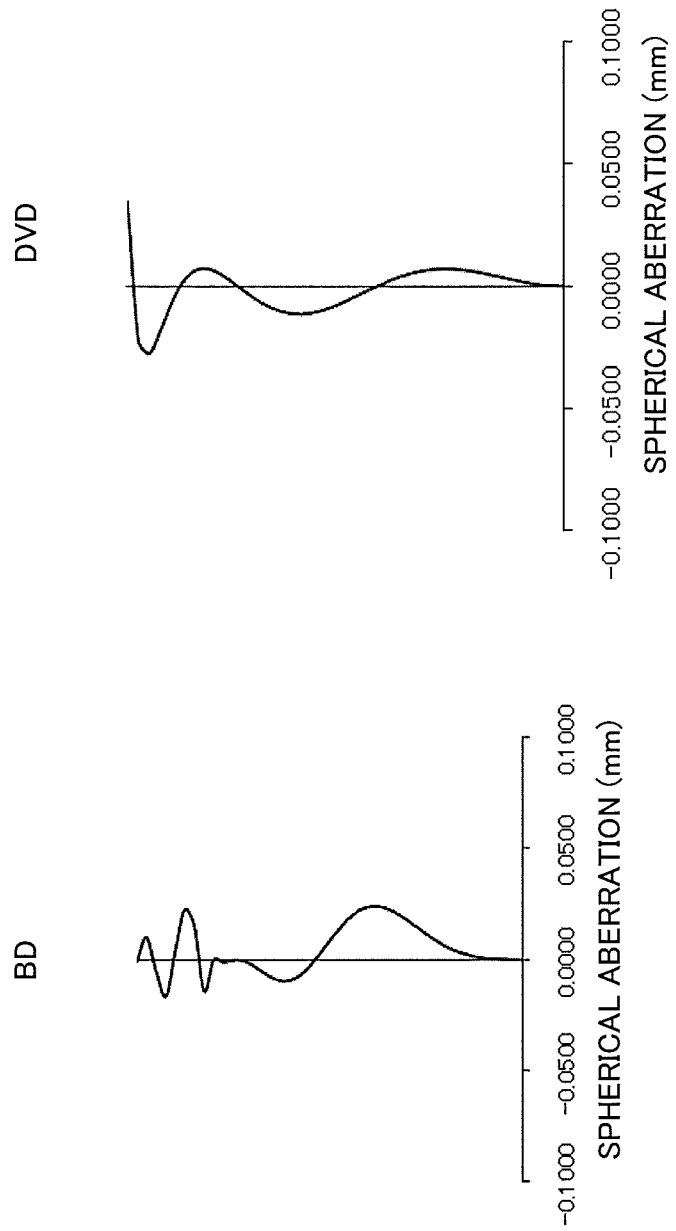
FIG. 10 is graphs each showing a spherical aberration when a parallel light beam is incident on the objective lens element according to Numerical Example 1.
Figure 11:
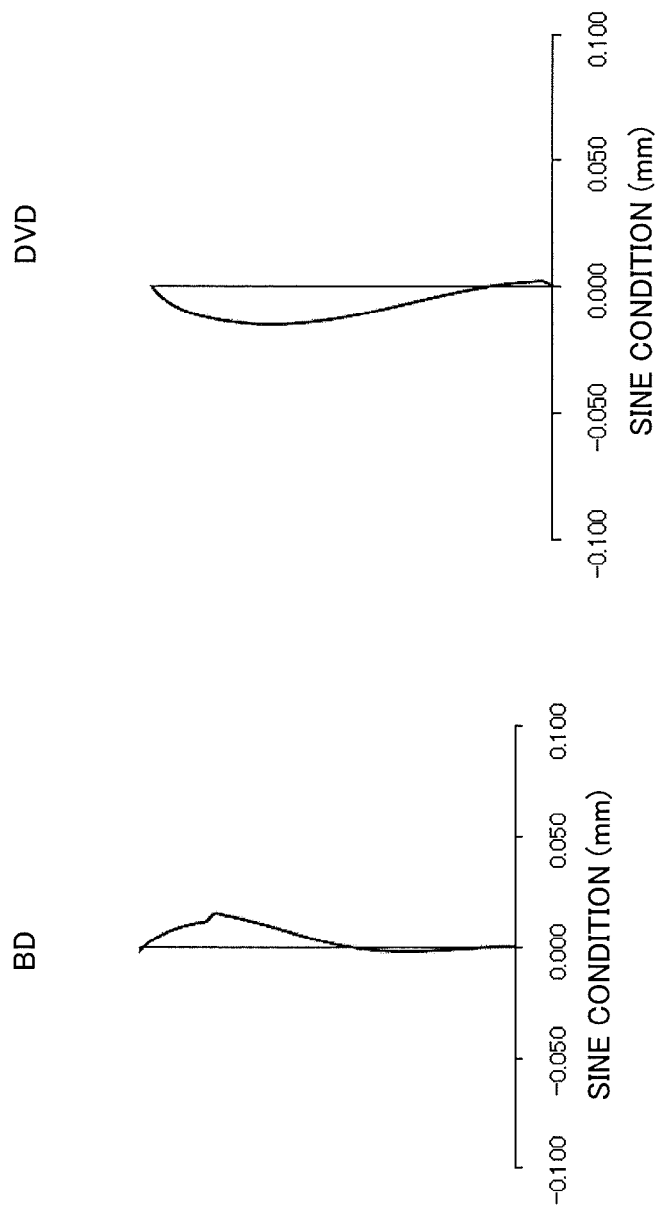
FIG. 11 is graphs each showing a sine condition when a parallel light beam is incident on the objective lens element according to Numerical Example 1.

FIG. 9 is an optical path diagram of the objective lens element according to Numerical Example 1. FIG. 10 is graphs each showing a spherical aberration when a parallel light beam is incident on the objective lens element according to Numerical Example 1. FIG. 11 is graphs each showing a sine condition when a parallel light beam is incident on the objective lens element according to Numerical Example 1. From FIGS. 10 and 11, it is recognized that aberrations are favorably compensated.

Table 5 shows ring zone cycles of the stair-like step structure provided on the inner part of the first surface, and cycles of steps arranged in each ring zone.

TABLE 5

| | Cycle (mm) |
|---|---|
| First ring zone | 0.158 |
| Second ring zone | 0.065 |
| Third ring zone | 0.050 |
| Fourth ring zone | 0.043 |
| Fifth ring zone | 0.038 |
| Sixth ring zone | 0.034 |
| Seventh ring zone | 0.031 |
| Eighth ring zone | 0.029 |
| Ninth ring zone | 0.028 |
| Tenth ring zone | 0.026 |
| Eleventh ring zone | 0.025 |
| Twelfth ring zone | 0.024 |
| Thirteenth ring zone | 0.023 |
| Fourteenth ring zone | 0.022 |
| Fifteenth ring zone | 0.021 |
| Sixteenth ring zone | 0.021 |
| Seventeenth ring zone | 0.020 |
| Eighteenth ring zone | 0.020 |
| Nineteenth ring zone | 0.019 |
| Twentieth ring zone | 0.019 |
| Twenty-first ring zone | 0.018 |
| Twenty-second ring zone | 0.018 |
| Twenty-third ring zone | 0.017 |
| Twenty-fourth ring zone | 0.017 |
| Twenty-fifth ring zone | 0.017 |
| Twenty-sixth ring zone | 0.016 |
| Twenty-seventh ring zone | 0.016 |
| Twenty-eighth ring zone | 0.015 |
| Twenty-ninth ring zone | 0.015 |

| | | Cycle (mm) |
|---|---|---|
| First ring zone | First step | 0.079 |
| | Second step | 0.033 |
| | Third step | 0.025 |
| | Fourth step | 0.021 |
| Second ring zone | First step | 0.019 |
| | Second step | 0.017 |
| | Third step | 0.016 |
| | Fourth step | 0.014 |
| Third ring zone | First step | 0.014 |
| | Second step | 0.013 |
| | Third step | 0.012 |
| | Fourth step | 0.012 |
| Fourth ring zone | First step | 0.011 |
| | Second step | 0.011 |
| | Third step | 0.010 |
| | Fourth step | 0.010 |
| Fifth ring zone | First step | 0.010 |
| | Second step | 0.010 |
| | Third step | 0.009 |
| | Fourth step | 0.009 |
| Sixth ring zone | First step | 0.009 |
| | Second step | 0.009 |
| | Third step | 0.008 |
| | Fourth step | 0.008 |
| Seventh ring zone | First step | 0.008 |
| | Second step | 0.008 |
| | Third step | 0.008 |
| | Fourth step | 0.008 |
| Eighth ring zone | First step | 0.008 |
| | Second step | 0.007 |
| | Third step | 0.007 |
| | Fourth step | 0.007 |

TABLE 5-continued

| | | |
|---|---|---|
| Ninth ring zone | First step | 0.007 |
| | Second step | 0.007 |
| | Third step | 0.007 |
| | Fourth step | 0.007 |
| Tenth ring zone | First step | 0.007 |
| | Second step | 0.007 |
| | Third step | 0.007 |
| | Fourth step | 0.006 |
| Eleventh ring zone | First step | 0.006 |
| | Second step | 0.006 |
| | Third step | 0.006 |
| | Fourth step | 0.006 |
| Twelfth ring zone | First step | 0.006 |
| | Second step | 0.006 |
| | Third step | 0.006 |
| | Fourth step | 0.006 |
| Thirteenth ring zone | First step | 0.006 |
| | Second step | 0.006 |
| | Third step | 0.006 |
| | Fourth step | 0.006 |
| Fourteenth ring zone | First step | 0.006 |
| | Second step | 0.006 |
| | Third step | 0.006 |
| | Fourth step | 0.005 |
| Fifteenth ring zone | First step | 0.005 |
| | Second step | 0.005 |
| | Third step | 0.005 |
| | Fourth step | 0.005 |
| Sixteenth ring zone | First step | 0.005 |
| | Second step | 0.005 |
| | Third step | 0.005 |
| | Fourth step | 0.005 |
| Seventeenth ring zone | First step | 0.005 |
| | Second step | 0.005 |
| | Third step | 0.005 |
| | Fourth step | 0.005 |
| Eighteenth ring zone | First step | 0.005 |
| | Second step | 0.005 |
| | Third step | 0.005 |
| | Fourth step | 0.005 |
| Nineteenth ring zone | First step | 0.005 |
| | Second step | 0.005 |
| | Third step | 0.005 |
| | Fourth step | 0.005 |
| Twentieth ring zone | First step | 0.005 |
| | Second step | 0.005 |
| | Third step | 0.005 |
| | Fourth step | 0.005 |
| Twenty-first ring zone | First step | 0.005 |
| | Second step | 0.005 |
| | Third step | 0.005 |
| | Fourth step | 0.005 |
| Twenty-second ring zone | First step | 0.004 |
| | Second step | 0.004 |
| | Third step | 0.004 |
| | Fourth step | 0.004 |
| Twenty-third ring zone | First step | 0.004 |
| | Second step | 0.004 |
| | Third step | 0.004 |
| | Fourth step | 0.004 |
| Twenty-fourth ring zone | First step | 0.004 |
| | Second step | 0.004 |
| | Third step | 0.004 |
| | Fourth step | 0.004 |
| Twenty-fifth ring zone | First step | 0.004 |
| | Second step | 0.004 |
| | Third step | 0.004 |
| | Fourth step | 0.004 |
| Twenty-sixth ring zone | First step | 0.004 |
| | Second step | 0.004 |
| | Third step | 0.004 |
| | Fourth step | 0.004 |
| Twenty-seventh ring zone | First step | 0.004 |
| | Second step | 0.004 |
| | Third step | 0.004 |
| | Fourth step | 0.004 |
| Twenty-eighth ring zone | First step | 0.004 |
| | Second step | 0.004 |
| | Third step | 0.004 |
| | Fourth step | 0.004 |
| Twenty-ninth ring zone | First step | 0.004 |
| | Second step | 0.004 |
| | Third step | 0.004 |
| | Fourth step | 0.004 |

On the inner part of the Numerical Example 1, one ring zone cycle consists of consecutive 4-level steps. Each ring zone cycle in Table 5 indicates the width of a ring zone in a radial direction (in a direction perpendicular to the optical axis) as indicated by an arrow in FIG. 3(b). On the inner part, a first ring zone, a second ring zone, a third ring zone, . . . , and a twenty-ninth ring zone are provided in order from the optical axis toward the outer circumference of the objective lens element. Further, each step cycle indicates the width, in the radial direction (in the direction perpendicular to the optical axis), of a step provided in each ring zone, as indicated by an arrow in FIG. 3(b). In each ring zone, the steps are referred to as a first step, a second step, a third step, and a fourth step in order from the optical axis side toward the outer circumference.

Table 6 shows ring zone cycles of the sawtooth-like diffraction structure provided on the outer part of the first surface.

TABLE 6

| | Cycle (mm) |
|---|---|
| First ring zone | 0.043 |
| Second ring zone | 0.029 |
| Third ring zone | 0.028 |
| Fourth ring zone | 0.026 |
| Fifth ring zone | 0.025 |
| Sixth ring zone | 0.024 |
| Seventh ring zone | 0.023 |
| Eighth ring zone | 0.022 |
| Ninth ring zone | 0.021 |

Each ring zone cycle in Table 6 indicates the width of a ring zone in the radial direction (in the direction perpendicular to the optical axis) as indicated by an arrow in FIG. 3(b). Specifically, each ring zone cycle indicates the distance between points (adjacent points) where the contour line of a lens effective surface (except wall surfaces of steps that are parallel to the optical axis) intersects an alternate long and short dashed line representing a curved surface MG2 in the cross-section shown in FIG. 3(b). On the outer part, a first ring zone, a second ring zone, a third ring zone, a fourth ring zone, . . . , and a ninth ring zone are provided in order from the optical axis toward the outer circumference of the objective lens element.

Table 7 shows step heights of the stair-like diffraction structure provided on the inner part of the first surface. In one cycle of the stair-like diffraction structure, the height of each of the first to third steps is set such that a phase difference of 1.25 wavelengths is provided to a light beam of a designed wavelength for BD, and the height of the fourth step is set such that a phase difference of 3.75 wavelengths is provided in the opposite direction.

TABLE 7

| | | Depth (mm) |
|---|---|---|
| First ring zone | First step | 0.98 |
| | Second step | 0.98 |
| | Third step | 0.98 |
| | Fourth step | 2.95 |

TABLE 7-continued

| | | Depth (mm) |
|---|---|---|
| Second ring zone | First step | 0.99 |
| | Second step | 0.99 |
| | Third step | 0.99 |
| | Fourth step | 2.97 |
| Third ring zone | First step | 0.99 |
| | Second step | 0.99 |
| | Third step | 1.00 |
| | Fourth step | 2.99 |
| Fourth ring zone | First step | 1.00 |
| | Second step | 1.00 |
| | Third step | 1.00 |
| | Fourth step | 3.01 |
| Fifth ring zone | First step | 1.01 |
| | Second step | 1.01 |
| | Third step | 1.01 |
| | Fourth step | 3.03 |
| Sixth ring zone | First step | 1.01 |
| | Second step | 1.01 |
| | Third step | 1.02 |
| | Fourth step | 3.05 |
| Seventh ring zone | First step | 1.02 |
| | Second step | 1.02 |
| | Third step | 1.02 |
| | Fourth step | 3.08 |
| Eighth ring zone | First step | 1.03 |
| | Second step | 1.03 |
| | Third step | 1.03 |
| | Fourth step | 3.10 |
| Ninth ring zone | First step | 1.04 |
| | Second step | 1.04 |
| | Third step | 1.04 |
| | Fourth step | 3.12 |
| Tenth ring zone | First step | 1.04 |
| | Second step | 1.05 |
| | Third step | 1.05 |
| | Fourth step | 3.15 |
| Eleventh ring zone | First step | 1.05 |
| | Second step | 1.05 |
| | Third step | 1.06 |
| | Fourth step | 3.18 |
| Twelfth ring zone | First step | 1.06 |
| | Second step | 1.06 |
| | Third step | 1.07 |
| | Fourth step | 3.20 |
| Thirteenth ring zone | First step | 1.07 |
| | Second step | 1.07 |
| | Third step | 1.07 |
| | Fourth step | 3.23 |
| Fourteenth ring zone | First step | 1.08 |
| | Second step | 1.08 |
| | Third step | 1.08 |
| | Fourth step | 3.26 |
| Fifteenth ring zone | First step | 1.09 |
| | Second step | 1.09 |
| | Third step | 1.09 |
| | Fourth step | 3.29 |
| Sixteenth ring zone | First step | 1.10 |
| | Second step | 1.10 |
| | Third step | 1.10 |
| | Fourth step | 3.32 |
| Seventeenth ring zone | First step | 1.11 |
| | Second step | 1.11 |
| | Third step | 1.11 |
| | Fourth step | 3.35 |
| Eighteenth ring zone | First step | 1.12 |
| | Second step | 1.12 |
| | Third step | 1.13 |
| | Fourth step | 3.39 |
| Nineteenth ring zone | First step | 1.13 |
| | Second step | 1.13 |
| | Third step | 1.14 |
| | Fourth step | 3.42 |
| Twentieth ring zone | First step | 1.14 |
| | Second step | 1.15 |
| | Third step | 1.15 |
| | Fourth step | 3.46 |
| Twenty-first ring zone | First step | 1.16 |
| | Second step | 1.16 |
| | Third step | 1.16 |
| | Fourth step | 3.49 |
| Twenty-second ring zone | First step | 1.17 |
| | Second step | 1.17 |
| | Third step | 1.17 |
| | Fourth step | 3.53 |
| Twenty-third ring zone | First step | 1.18 |
| | Second step | 1.18 |
| | Third step | 1.19 |
| | Fourth step | 3.58 |
| Twenty-fourth ring zone | First step | 1.20 |
| | Second step | 1.20 |
| | Third step | 1.20 |
| | Fourth step | 3.62 |
| Twenty-fifth ring zone | First step | 1.21 |
| | Second step | 1.21 |
| | Third step | 1.22 |
| | Fourth step | 3.67 |
| Twenty-sixth ring zone | First step | 1.23 |
| | Second step | 1.23 |
| | Third step | 1.23 |
| | Fourth step | 3.71 |
| Twenty-seventh ring zone | First step | 1.24 |
| | Second step | 1.25 |
| | Third step | 1.25 |
| | Fourth step | 3.77 |
| Twenty-eighth ring zone | First step | 1.26 |
| | Second step | 1.26 |
| | Third step | 1.27 |
| | Fourth step | 3.82 |
| Twenty-ninth ring zone | First step | 1.28 |
| | Second step | 1.28 |
| | Third step | 1.29 |

Table 8 shows step heights of the sawtooth-like diffraction structure provided on the outer part of the first surface. The step heights of the sawtooth-like diffraction structure are set such that a phase difference of 3 wavelengths is provided to the light beam of the designed wavelength for BD, and a +3rd order diffracted light beam is used.

TABLE 8

| | | Depth (μm) |
|---|---|---|
| First ring zone | First step | 3.27 |
| Second ring zone | Second step | 3.66 |
| Third ring zone | Third step | 3.44 |
| Fourth ring zone | Fourth step | 3.51 |
| Fifth ring zone | Fifth step | 3.56 |
| Sixth ring zone | Sixth step | 3.58 |
| Seventh ring zone | Seventh step | 3.57 |
| Eighth ring zone | Eighth step | 3.53 |
| Ninth ring zone | Ninth step | 3.44 |

Figure 12:
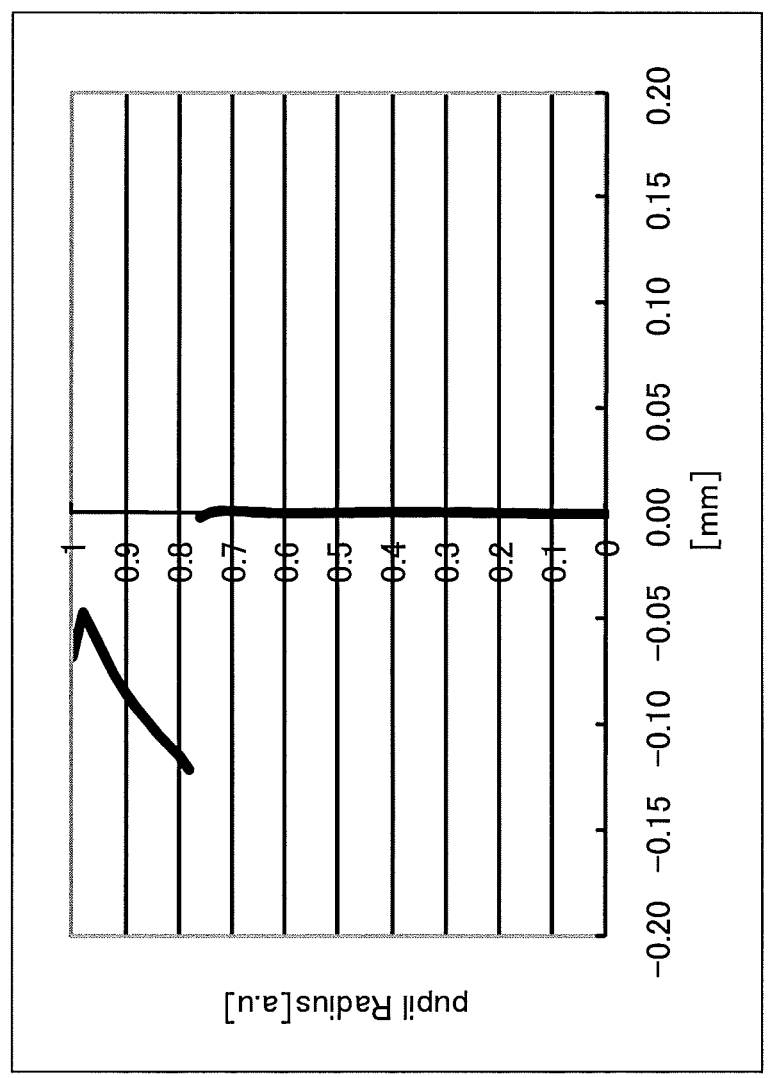
FIG. 12 is a graph showing a longitudinal aberration of the objective lens element according to Numerical Example 1.

FIG. 12 is a graph showing a longitudinal aberration when a light beam having a wavelength of 658 nm for DVD and a diameter equal to the effective diameter of a BD is incident on an incident surface of the objective lens element according to Numerical Example 1.

It is seen that the focal point of a light beam having passed through the outer part of the objective lens element is displaced in the optical axis direction by about 0.13 mm and an excessive spherical aberration occurs. The outer part favorably exerts an aperture limiting function such that the incident light beam for DVD is not converged and does not become stray light.

Numerical Example 2

Numerical Example 2 corresponds to Embodiment 2. A first surface of an objective lens element according to Numerical Example 2 is divided into an inner part including a symmetry axis, an intermediate part surrounding the inner part, and an outer part surrounding the intermediate part. The inner part of the first surface is provided with a stair-like diffraction structure. The intermediate part is provided with a stair-like diffraction structure different from that on the inner part. The outer part is provided with a sawtooth-like diffraction structure. A second surface of the objective lens element consists of an aspheric surface. The objective lens element according to Numerical Example 2 is a BD/DVD/CD compatible lens. With regard to designed values for BD, the wavelength is 408 nm; the focal length is 1.8 mm; the numerical aperture (NA) is 0.86; and the protective layer thickness of an information storage medium is 87.5 μm. With regard to designed values for DVD, the wavelength is 658 nm; the focal length is 2.0 mm; the NA is 0.6; and the protective layer thickness of an information storage medium is 0.6 mm. With regard to designed values for CD, the wavelength is 785 nm; the focal length is 2.1 mm; the NA is 0.47; and the protective layer thickness of an information storage medium is 1.2 mm.

Tables 9 and 10 show construction data of the objective lens element according to Numerical Example 2.

TABLE 9

| | BD | DVD | CD |
|---|---|---|---|
| Wavelength | 0.408 | 0.658 | 0.785 |
| Diameter of aperture | 3.08 | 2.37 | 2.05 |
| NA | 0.86 | 0.6 | 0.47 |
| Working distance (WD) | 0.53 | 0.43 | 0.3 |
| Disc thickness (DT) | 0.0875 | 0.6 | 1.2 |
| Focal length | 1.8 | 2.0 | 2.1 |
| Diffraction order of inner part of the first surface | 2 | −2 | −3 |
| Diffraction order of intermediate part of the first surface | 1 | −1 | — |
| Diffraction order of outer part of the first surface | 3 | — | — |
| Object point (OP) | ∞ | −76 | 100 |

| Surface No. | Radius of curvature at the top | Thickness | Material | Remarks column |
|---|---|---|---|---|
| 0 | | OP | | Inner part (diffractive surface) Intermediate part (diffractive surface) Outer part (diffractive surface) |
| 1 | 1.1717432 | 2.185991 | n1 | Aspheric surface |
| 2 | −1.983364 | WD | | |
| 3 | ∞ | DT | disk | Plane |
| 4 | ∞ | | | Plane |

| | Wavelength | 0.408 | 0.658 | 0.785 |
|---|---|---|---|---|
| | n1 | 1.52173 | 1.50389 | 1.50072 |
| | disk | 1.61642 | 1.57829 | 1.57203 |

TABLE 10

| First surface | Inner part Diffractive surface |
|---|---|

| | Diffractive surface |
|---|---|
| Region | 0 mm-1.02 mm Aspheric constant |
| RD | 1.1717432 |
| k | −0.65219099 |
| A0 | 0 |
| A2 | 0 |
| A4 | 0.015687974 |
| A6 | 0.005203019 |
| A8 | −0.00798319 |
| A10 | 0.018829131 |
| A12 | −0.018113328 |
| A14 | 0.009073206 |
| A16 | −0.001775416 |

| First surface | Inner part Phase function Diffractive surface |
|---|---|
| P2 | −95.056152 |
| P4 | 0.53673157 |
| P6 | 0.23124439 |

| First surface | Intermediate part Diffractive surface |
|---|---|

| | Diffractive surface |
|---|---|
| Region | 1.02 mm-1.19 mm Aspheric constant |
| RD | 1.1717432 |
| k | −0.65219099 |
| A0 | 0 |
| A2 | 0 |
| A4 | 0.015687974 |
| A6 | 0.005203019 |
| A8 | −0.00798319 |
| A10 | 0.018829131 |
| A12 | −0.018113328 |
| A14 | 0.009073206 |
| A16 | −0.001775416 |

| First surface | Intermediate part Phase function Diffractive surface |
|---|---|
| P2 | −190.1123 |
| P4 | 1.0734631 |
| P6 | 0.46248878 |

| First surface | Outer part Diffractive surface |
|---|---|

| | Diffractive surface |
|---|---|
| Region | 1.19 mm-1.54 mm Aspheric constant |
| RD | 1.1476107 |
| k | −0.66945601 |
| A0 | 0.012399303 |
| A2 | 0 |
| A4 | −0.001400947 |
| A6 | 0.013945514 |
| A8 | −0.002083758 |
| A10 | −0.002079095 |
| A12 | 0.000646384 |
| A14 | 0.000174618 |
| A16 | −5.43E−05 |
| A18 | 2.15E−05 |
| A20 | −3.89E−06 |
| A22 | −3.86E−06 |

| First surface | Inner part Phase function Diffractive surface |
|---|---|
| P2 | −23.390365 |
| P4 | −67.55212 |
| P6 | −37.236633 |

TABLE 10-continued

| Second surface | Aspheric surface Aspheric constant |
|---|---|
| RD | −1.983364 |
| k | −32.2964 |
| A0 | 0 |
| A2 | 0 |
| A4 | 0.12127011 |
| A6 | −0.060296646 |
| A8 | −0.033153877 |
| A10 | 0.011883167 |
| A12 | 0.016785831 |
| A14 | 0.005090454 |
| A16 | −0.00419985 |
| A18 | −0.005928667 |
| A20 | −0.00200897 |
| A22 | 0.00313813 |

Figure 13:
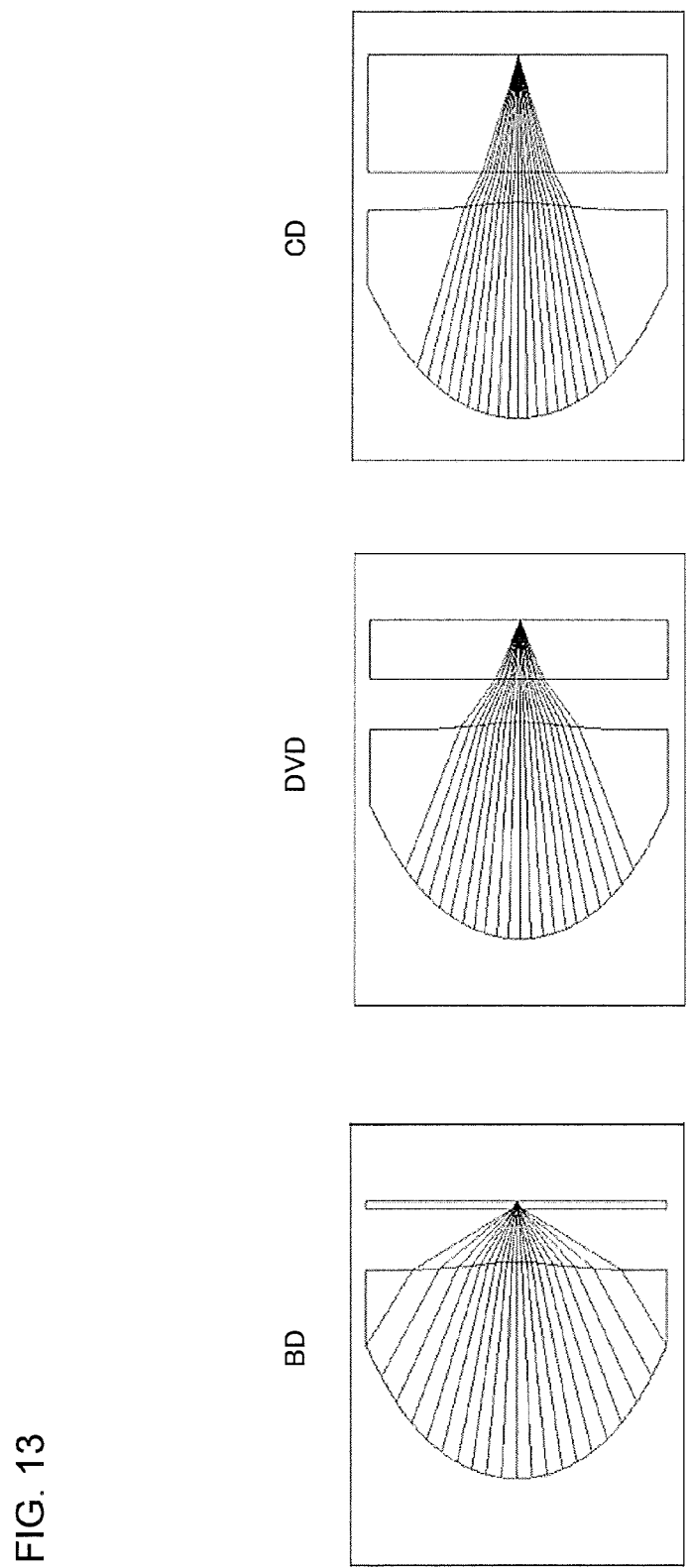
FIG. 13 is an optical path diagram of an objective lens element according to Numerical Example 2.
Figure 14:
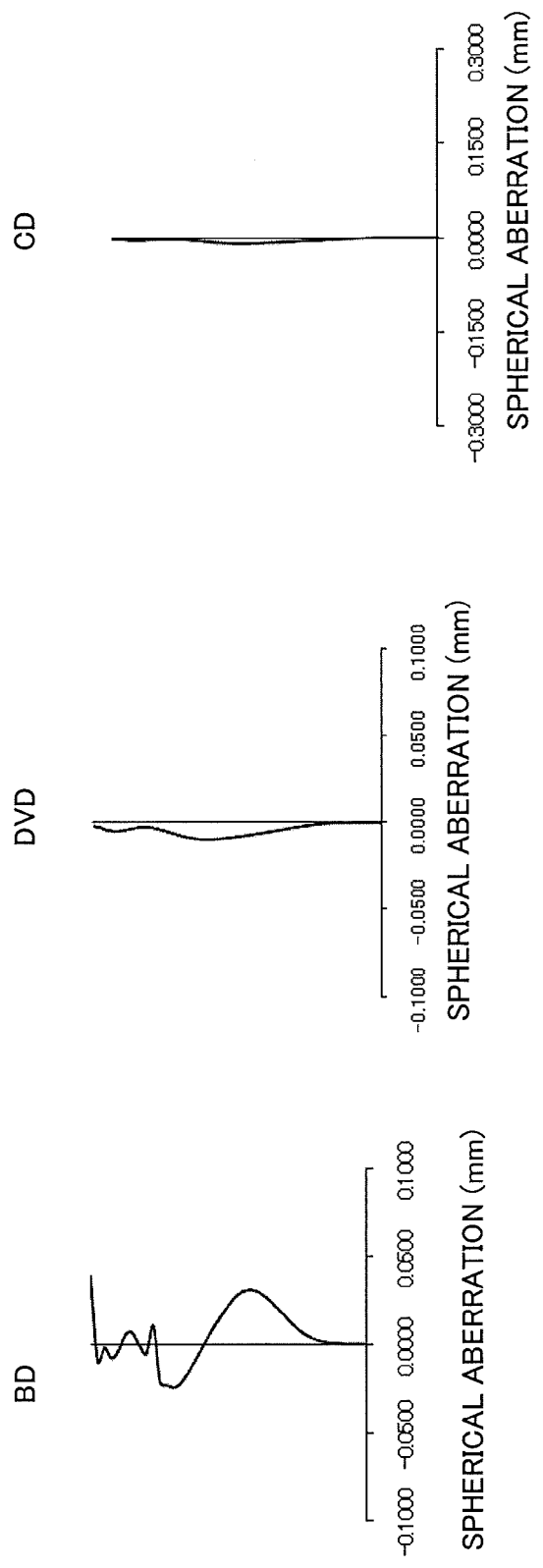
FIG. 14 is graphs each showing a spherical aberration when a parallel light beam is incident on the objective lens element according to Numerical Example 2.
Figure 15:
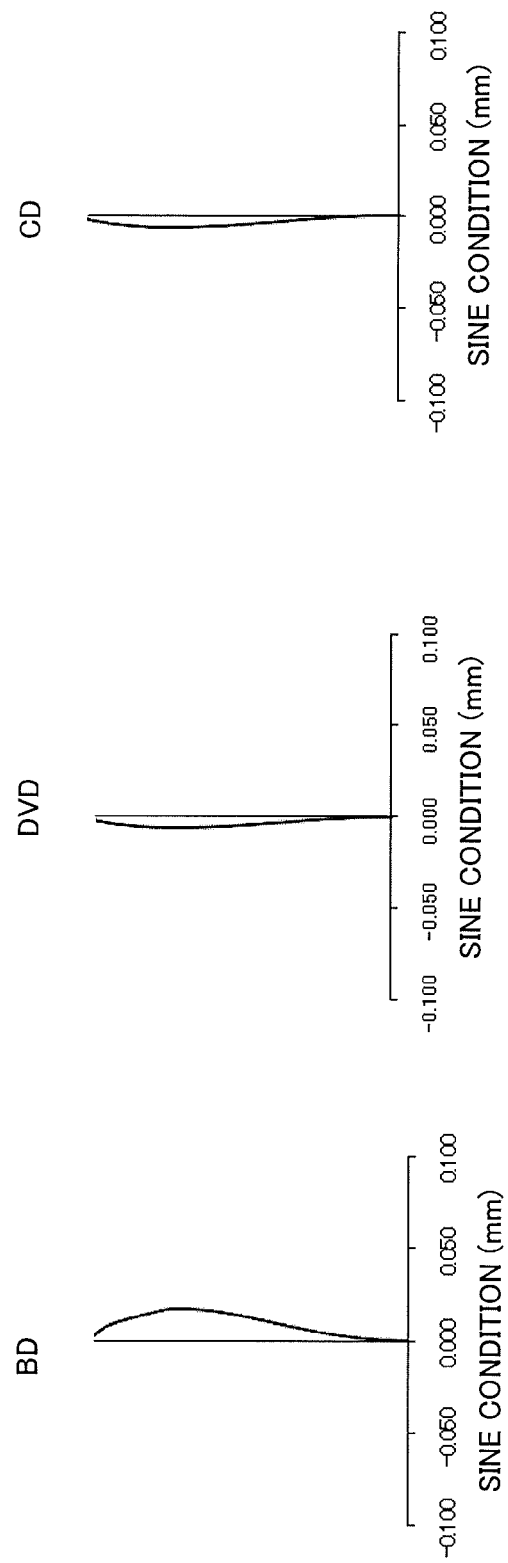
FIG. 15 is graphs each showing a sine condition when a parallel light beam is incident on the objective lens element according to Numerical Example 2.

FIG. 13 is an optical path diagram of the objective lens element according to Numerical Example 2. FIG. 14 is graphs each showing a spherical aberration when a parallel light beam is incident on the objective lens element according to Numerical Example 2. FIG. 15 is graphs each showing a sine condition when a parallel light beam is incident on the objective lens element according to Numerical Example 2. From FIGS. 14 and 15, it is recognized that aberrations are favorably compensated.

Table 11 shows ring zone cycles of the stair-like step structure provided on the inner part of the first surface, and cycles of steps arranged in each ring zone.

TABLE 11

| | Cycle (mm) |
|---|---|
| First ring zone | 0.257 |
| Second ring zone | 0.107 |
| Third ring zone | 0.081 |
| Fourth ring zone | 0.069 |
| Fifth ring zone | 0.061 |
| Sixth ring zone | 0.055 |
| Seventh ring zone | 0.051 |
| Eighth ring zone | 0.047 |
| Ninth ring zone | 0.044 |
| Tenth ring zone | 0.042 |
| Eleventh ring zone | 0.040 |
| Twelfth ring zone | 0.038 |
| Thirteenth ring zone | 0.037 |
| Fourteenth ring zone | 0.035 |
| Fifteenth ring zone | 0.034 |
| Sixteenth ring zone | 0.033 |

| | | Cycle (mm) |
|---|---|---|
| First ring zone | First step | 0.091 |
| | Second step | 0.038 |
| | Third step | 0.029 |
| | Fourth step | 0.024 |
| | Fifth step | 0.021 |
| | Sixth step | 0.019 |
| | Seventh step | 0.018 |
| | Eighth step | 0.017 |
| Second ring zone | First step | 0.016 |
| | Second step | 0.015 |
| | Third step | 0.014 |
| | Fourth step | 0.013 |
| | Fifth step | 0.013 |
| | Sixth step | 0.012 |
| | Seventh step | 0.012 |
| | Eighth step | 0.012 |
| Third ring zone | First step | 0.011 |
| | Second step | 0.011 |
| | Third step | 0.011 |
| | Fourth step | 0.010 |
| | Fifth step | 0.010 |
| | Sixth step | 0.010 |
| | Seventh step | 0.010 |
| | Eighth step | 0.009 |
| Fourth ring zone | First step | 0.009 |
| | Second step | 0.009 |
| | Third step | 0.009 |
| | Fourth step | 0.009 |
| | Fifth step | 0.009 |
| | Sixth step | 0.008 |
| | Seventh step | 0.008 |
| | Eighth step | 0.008 |
| Fifth ring zone | First step | 0.008 |
| | Second step | 0.008 |
| | Third step | 0.008 |
| | Fourth step | 0.008 |
| | Fifth step | 0.008 |
| | Sixth step | 0.007 |
| | Seventh step | 0.007 |
| | Eighth step | 0.007 |
| Sixth ring zone | First step | 0.007 |
| | Second step | 0.007 |
| | Third step | 0.007 |
| | Fourth step | 0.007 |
| | Fifth step | 0.007 |
| | Sixth step | 0.007 |
| | Seventh step | 0.007 |
| | Eighth step | 0.007 |
| Seventh ring zone | First step | 0.007 |
| | Second step | 0.006 |
| | Third step | 0.006 |
| | Fourth step | 0.006 |
| | Fifth step | 0.006 |
| | Sixth step | 0.006 |
| | Seventh step | 0.006 |
| | Eighth step | 0.006 |
| Eighth ring zone | First step | 0.006 |
| | Second step | 0.006 |
| | Third step | 0.006 |
| | Fourth step | 0.006 |
| | Fifth step | 0.006 |
| | Sixth step | 0.006 |
| | Seventh step | 0.006 |
| | Eighth step | 0.006 |
| Ninth ring zone | First step | 0.006 |
| | Second step | 0.006 |
| | Third step | 0.006 |
| | Fourth step | 0.006 |
| | Fifth step | 0.006 |
| | Sixth step | 0.005 |
| | Seventh step | 0.005 |
| | Eighth step | 0.005 |
| Tenth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Eleventh ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Twelfth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |

TABLE 11-continued

| | | |
|---|---|---|
| Thirteenth ring zone | First step | 0.005 |
| | Second step | 0.005 |
| | Third step | 0.005 |
| | Fourth step | 0.005 |
| | Fifth step | 0.005 |
| | Sixth step | 0.005 |
| | Seventh step | 0.005 |
| | Eighth step | 0.005 |
| Fourteenth ring zone | First step | 0.005 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |
| Fifteenth ring zone | First step | 0.004 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |
| Sixteenth ring zone | First step | 0.004 |
| | Second step | 0.004 |
| | Third step | 0.004 |
| | Fourth step | 0.004 |
| | Fifth step | 0.004 |
| | Sixth step | 0.004 |
| | Seventh step | 0.004 |
| | Eighth step | 0.004 |

On the inner part of Numerical Example 2, one ring zone cycle consists of consecutive 8-level steps. Each ring zone cycle in Table 12 indicates the width of a ring zone in a radial direction (in a direction perpendicular to the optical axis) as indicated by an arrow in FIG. 7(b). On the inner part, a first ring zone, a second ring zone, a third ring zone, . . . , and a sixteenth ring zone are provided in order from the optical axis toward the outer circumference of the objective lens element. Further, each step cycle indicates the width, in the radial direction (in the direction perpendicular to the optical axis), of a step provided in each ring zone, as indicated by an arrow in FIG. 7(b). In each ring zone, the steps are referred to as a first step, a second step, a third step, . . . , and an eighth step in order from the optical axis side toward the outer circumference.

Table 12 shows ring zone cycles of the stair-like diffraction structure provided on the intermediate part of the first surface, and cycles of steps arranged in each ring zone.

TABLE 12

| | Cycle (mm) |
|---|---|
| First ring zone | 0.016 |
| Second ring zone | 0.016 |
| Third ring zone | 0.016 |
| Fourth ring zone | 0.016 |
| Fifth ring zone | 0.016 |
| Sixth ring zone | 0.015 |
| Seventh ring zone | 0.015 |
| Eighth ring zone | 0.015 |
| Ninth ring zone | 0.015 |
| Tenth ring zone | 0.015 |
| Eleventh ring zone | 0.014 |

| | | Cycle (mm) |
|---|---|---|
| First ring zone | First step | 0.004 |
| | Second step | 0.004 |
| | Third step | 0.004 |
| | Fourth step | 0.004 |

TABLE 12-continued

| | | |
|---|---|---|
| Second ring zone | First step | 0.004 |
| | Second step | 0.004 |
| | Third step | 0.004 |
| | Fourth step | 0.004 |
| Third ring zone | First step | 0.004 |
| | Second step | 0.004 |
| | Third step | 0.004 |
| | Fourth step | 0.004 |
| Fourth ring zone | First step | 0.004 |
| | Second step | 0.004 |
| | Third step | 0.004 |
| | Fourth step | 0.004 |
| Fifth ring zone | First step | 0.004 |
| | Second step | 0.004 |
| | Third step | 0.004 |
| | Fourth step | 0.004 |
| Sixth ring zone | First step | 0.004 |
| | Second step | 0.004 |
| | Third step | 0.004 |
| | Fourth step | 0.004 |
| Seventh ring zone | First step | 0.004 |
| | Second step | 0.004 |
| | Third step | 0.004 |
| | Fourth step | 0.004 |
| Eighth ring zone | First step | 0.004 |
| | Second step | 0.004 |
| | Third step | 0.004 |
| | Fourth step | 0.004 |
| Ninth ring zone | First step | 0.004 |
| | Second step | 0.004 |
| | Third step | 0.004 |
| | Fourth step | 0.004 |
| Tenth ring zone | First step | 0.004 |
| | Second step | 0.004 |
| | Third step | 0.004 |
| | Fourth step | 0.004 |
| Eleventh ring zone | First step | 0.004 |
| | Second step | 0.004 |
| | Third step | 0.004 |
| | Fourth step | 0.004 |

On the intermediate part of Numerical Example 2, one ring zone cycle consists of consecutive 4-level steps. Each ring zone cycle in Table 12 indicates the width of a ring zone in the radial direction (in the direction perpendicular to the optical axis) as indicated by an arrow in FIG. 7(b). On the intermediate part, a first ring zone, a second ring zone, a third ring zone, . . . , and a eleventh ring zone are provided in order from the optical axis toward the outer circumference of the objective lens element. Further, a step cycle indicates the width, in the radial direction (in the direction perpendicular to the optical axis), of a step provided in each ring zone, as indicated by an arrow in FIG. 7(b). In each ring zone, the steps are referred to as a first step, a second step, a third step, and a fourth step in order from the optical axis side toward the outer circumference.

Table 13 shows ring zone cycles of the sawtooth-like diffraction structure provided on the outer part of the first surface.

TABLE 13

| | Cycle (mm) |
|---|---|
| First ring zone | 0.017 |
| Second ring zone | 0.016 |
| Third ring zone | 0.015 |
| Fourth ring zone | 0.015 |
| Fifth ring zone | 0.015 |
| Sixth ring zone | 0.014 |
| Seventh ring zone | 0.013 |
| Eighth ring zone | 0.013 |
| Ninth ring zone | 0.012 |
| Tenth ring zone | 0.012 |

TABLE 13-continued

| | Cycle (mm) |
|---|---|
| Eleventh ring zone | 0.012 |
| Twelfth ring zone | 0.011 |
| Thirteenth ring zone | 0.011 |
| Fourteenth ring zone | 0.010 |
| Fifteenth ring zone | 0.010 |
| Sixteenth ring zone | 0.010 |
| Seventeenth ring zone | 0.010 |
| Eighteenth ring zone | 0.009 |
| Nineteenth ring zone | 0.009 |
| Twentieth ring zone | 0.009 |
| Twenty-first ring zone | 0.009 |
| Twenty-second ring zone | 0.008 |
| Twenty-third ring zone | 0.008 |
| Twenty-fourth ring zone | 0.008 |
| Twenty-fifth ring zone | 0.008 |
| Twenty-sixth ring zone | 0.008 |
| Twenty-seventh ring zone | 0.007 |
| Twenty-eighth ring zone | 0.007 |
| Twenty-ninth ring zone | 0.007 |
| Thirtieth ring zone | 0.007 |
| Thirty-first ring zone | 0.007 |
| Thirty-second ring zone | 0.007 |
| Thirty-third ring zone | 0.007 |
| Thirty-fourth ring zone | 0.006 |
| Thirty-fifth ring zone | 0.006 |

Each ring zone cycle in Table 13 is defined similarly to Numerical Example 1, and indicates the width of a ring zone in the radial direction (in the direction perpendicular to the optical axis) as indicated by the arrow in FIG. 3(b). On the outer part, a first ring zone, a second ring zone, a third ring zone, a fourth ring zone, . . . , and a thirty-fifth ring zone are provided in order from the optical axis toward the outer circumference of the objective lens element. Further, step heights of the sawtooth-like diffraction structure are set such that a phase difference of 3 wavelengths is provided to a light beam of a designed wavelength for BD, and a +3rd order diffracted light beam is used.

Table 14 shows step heights of the stair-like diffraction structure provided on the inner part of the first surface.

TABLE 14

| | | Depth (μm) |
|---|---|---|
| First ring zone | First step | 0.98 |
| | Second step | 0.98 |
| | Third step | 0.98 |
| | Fourth step | 0.98 |
| | Fifth step | 0.98 |
| | Sixth step | 0.98 |
| | Seventh step | 0.99 |
| | Eighth step | 6.91 |
| Second ring zone | First step | 0.99 |
| | Second step | 0.99 |
| | Third step | 0.99 |
| | Fourth step | 0.99 |
| | Fifth step | 0.99 |
| | Sixth step | 0.99 |
| | Seventh step | 0.99 |
| | Eighth step | 6.97 |
| Third ring zone | First step | 1.00 |
| | Second step | 1.00 |
| | Third step | 1.00 |
| | Fourth step | 1.00 |
| | Fifth step | 1.00 |
| | Sixth step | 1.00 |
| | Seventh step | 1.00 |
| | Eighth step | 7.04 |
| Fourth ring zone | First step | 1.01 |
| | Second step | 1.01 |
| | Third step | 1.01 |
| | Fourth step | 1.01 |
| | Fifth step | 1.01 |
| | Sixth step | 1.01 |
| | Seventh step | 1.02 |
| | Eighth step | 7.11 |
| Fifth ring zone | First step | 1.02 |
| | Second step | 1.02 |
| | Third step | 1.02 |
| | Fourth step | 1.02 |
| | Fifth step | 1.02 |
| | Sixth step | 1.02 |
| | Seventh step | 1.03 |
| | Eighth step | 7.19 |
| Sixth ring zone | First step | 1.03 |
| | Second step | 1.03 |
| | Third step | 1.03 |
| | Fourth step | 1.03 |
| | Fifth step | 1.03 |
| | Sixth step | 1.04 |
| | Seventh step | 1.04 |
| | Eighth step | 7.27 |
| Seventh ring zone | First step | 1.04 |
| | Second step | 1.04 |
| | Third step | 1.04 |
| | Fourth step | 1.04 |
| | Fifth step | 1.05 |
| | Sixth step | 1.05 |
| | Seventh step | 1.05 |
| | Eighth step | 7.35 |
| Eighth ring zone | First step | 1.05 |
| | Second step | 1.05 |
| | Third step | 1.05 |
| | Fourth step | 1.06 |
| | Fifth step | 1.06 |
| | Sixth step | 1.06 |
| | Seventh step | 1.06 |
| | Eighth step | 7.43 |
| Ninth ring zone | First step | 1.06 |
| | Second step | 1.07 |
| | Third step | 1.07 |
| | Fourth step | 1.07 |
| | Fifth step | 1.07 |
| | Sixth step | 1.07 |
| | Seventh step | 1.07 |
| | Eighth step | 7.52 |
| Tenth ring zone | First step | 1.08 |
| | Second step | 1.08 |
| | Third step | 1.08 |
| | Fourth step | 1.08 |
| | Fifth step | 1.08 |
| | Sixth step | 1.08 |
| | Seventh step | 1.09 |
| | Eighth step | 7.62 |
| Eleventh ring zone | First step | 1.09 |
| | Second step | 1.09 |
| | Third step | 1.09 |
| | Fourth step | 1.10 |
| | Fifth step | 1.10 |
| | Sixth step | 1.10 |
| | Seventh step | 1.10 |
| | Eighth step | 7.71 |
| Twelfth ring zone | First step | 1.10 |
| | Second step | 1.11 |
| | Third step | 1.11 |
| | Fourth step | 1.11 |
| | Fifth step | 1.11 |
| | Sixth step | 1.11 |
| | Seventh step | 1.11 |
| | Eighth step | 7.82 |

TABLE 14-continued

|  |  | Depth (μm) |
|---|---|---|
| Thirteenth ring zone | First step | 1.12 |
|  | Second step | 1.12 |
|  | Third step | 1.12 |
|  | Fourth step | 1.12 |
|  | Fifth step | 1.13 |
|  | Sixth step | 1.13 |
|  | Seventh step | 1.13 |
|  | Eighth step | 7.93 |
| Fourteenth ring zone | First step | 1.13 |
|  | Second step | 1.14 |
|  | Third step | 1.14 |
|  | Fourth step | 1.14 |
|  | Fifth step | 1.14 |
|  | Sixth step | 1.14 |
|  | Seventh step | 1.15 |
|  | Eighth step | 8.04 |
| Fifteenth ring zone | First step | 1.15 |
|  | Second step | 1.15 |
|  | Third step | 1.16 |
|  | Fourth step | 1.16 |
|  | Fifth step | 1.16 |
|  | Sixth step | 1.16 |
|  | Seventh step | 1.16 |
|  | Eighth step | 8.16 |
| Sixteenth ring zone | First step | 1.17 |
|  | Second step | 1.17 |
|  | Third step | 1.17 |
|  | Fourth step | 1.18 |
|  | Fifth step | 1.18 |
|  | Sixth step | 1.18 |
|  | Seventh step | 1.18 |
|  | Eighth step | 8.29 |

Table 15 shows step heights of the stair-like diffraction structure provided on the intermediate part of the first surface.

TABLE 15

|  |  | Depth (μm) |
|---|---|---|
| First ring zone | First step | 1.18 |
|  | Second step | 1.18 |
|  | Third step | 1.18 |
|  | Fourth step | 3.56 |
| Second ring zone | First step | 1.19 |
|  | Second step | 1.19 |
|  | Third step | 1.19 |
|  | Fourth step | 3.59 |
| Third ring zone | First step | 1.20 |
|  | Second step | 1.20 |
|  | Third step | 1.20 |
|  | Fourth step | 3.62 |
| Fourth ring zone | First step | 1.21 |
|  | Second step | 1.21 |
|  | Third step | 1.21 |
|  | Fourth step | 3.65 |
| Fifth ring zone | First step | 1.22 |
|  | Second step | 1.22 |
|  | Third step | 1.22 |
|  | Fourth step | 3.68 |
| Sixth ring zone | First step | 1.23 |
|  | Second step | 1.23 |
|  | Third step | 1.24 |
|  | Fourth step | 3.72 |
| Seventh ring zone | First step | 1.24 |
|  | Second step | 1.24 |
|  | Third step | 1.25 |
|  | Fourth step | 3.75 |
| Eighth ring zone | First step | 1.25 |
|  | Second step | 1.26 |
|  | Third step | 1.26 |
|  | Fourth step | 3.79 |
| Ninth ring zone | First step | 1.26 |
|  | Second step | 1.27 |
|  | Third step | 1.27 |
|  | Fourth step | 3.82 |

TABLE 15-continued

|  |  | Depth (μm) |
|---|---|---|
| Tenth ring zone | First step | 1.28 |
|  | Second step | 1.28 |
|  | Third step | 1.28 |
|  | Fourth step | 3.86 |
| Eleventh ring zone | First step | 1.29 |
|  | Second step | 1.29 |
|  | Third step | 1.30 |
|  | Fourth step | 3.90 |

Table 16 shows the step heights of the sawtooth-like diffraction structure provided on the outer part of the first surface.

TABLE 16

|  | Depth (μm) |
|---|---|
| First ring zone | 3.18 |
| Second ring zone | 3.22 |
| Third ring zone | 3.26 |
| Fourth ring zone | 3.30 |
| Fifth ring zone | 3.33 |
| Sixth ring zone | 3.37 |
| Seventh ring zone | 3.41 |
| Eighth ring zone | 3.45 |
| Ninth ring zone | 3.49 |
| Tenth ring zone | 3.53 |
| Eleventh ring zone | 3.56 |
| Twelfth ring zone | 3.60 |
| Thirteenth ring zone | 3.64 |
| Fourteenth ring zone | 3.68 |
| Fifteenth ring zone | 3.71 |
| Sixteenth ring zone | 3.75 |
| Seventeenth ring zone | 3.78 |
| Eighteenth ring zone | 3.82 |
| Nineteenth ring zone | 3.85 |
| Twentieth ring zone | 3.88 |
| Twenty-first ring zone | 3.91 |
| Twenty-second ring zone | 3.94 |
| Twenty-third ring zone | 3.97 |
| Twenty-fourth ring zone | 4.00 |
| Twenty-fifth ring zone | 4.02 |
| Twenty-sixth ring zone | 4.04 |
| Twenty-seventh ring zone | 4.06 |
| Twenty-eighth ring zone | 4.08 |
| Twenty-ninth ring zone | 4.10 |
| Thirtieth ring zone | 4.11 |
| Thirty-first ring zone | 4.12 |
| Thirty-second ring zone | 4.13 |
| Thirty-third ring zone | 4.13 |
| Thirty-fourth ring zone | 4.13 |
| Thirty-fifth ring zone | 4.13 |

Figure 16:
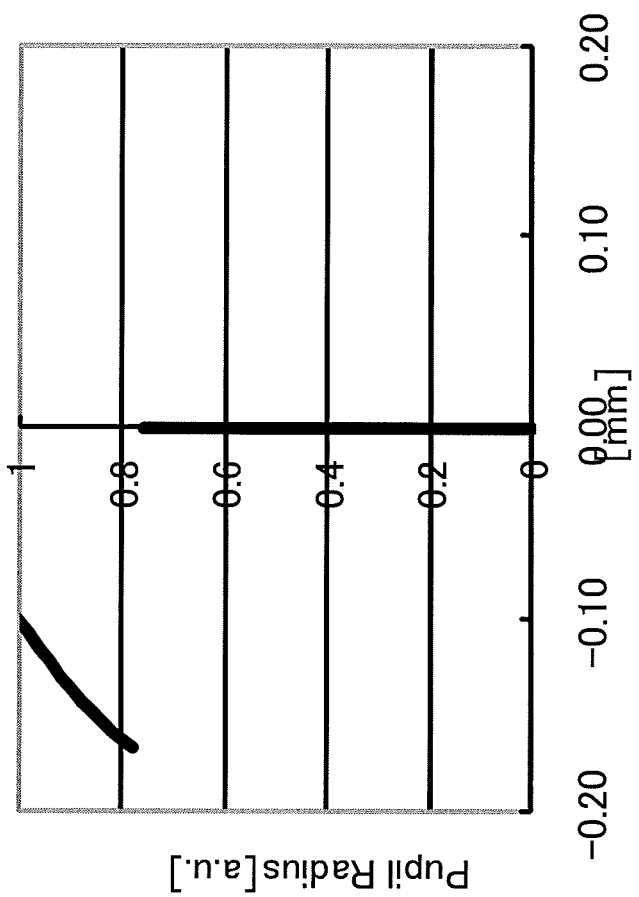
FIG. 16 is a graph showing a longitudinal aberration of the objective lens element according to Numerical Example 2.

FIG. 16 is a graph showing a longitudinal aberration when a light beam having a wavelength of 658 nm for DVD and a diameter equal to the effective diameter of a BD is incident on an incident surface of the objective lens element according to Numerical Example 2.

It is seen that the focal point of a light beam having passed through the outer part of the objective lens element is displaced in the optical axis direction by about 0.18 mm and an excessive spherical aberration occurs. Thus, the outer part favorably exerts an aperture limiting function such that the incident light beam for DVD is not converged and does not become stray light.

Figure 17:
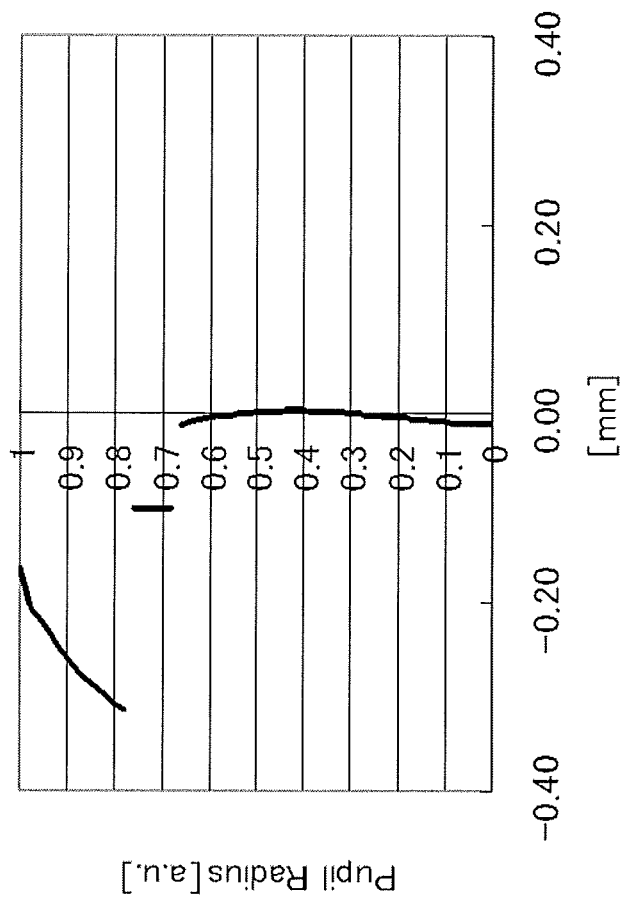
FIG. 17 is a graph showing a longitudinal aberration of the objective lens element according to Numerical Example 2.

FIG. 17 is a graph showing a longitudinal aberration when a light beam having a wavelength of 785 nm for CD and a diameter equal to the effective diameter of a BD is incident on the incident surface of the objective lens element according to Numerical Example 2.

It is seen that the focal point of a light beam having passed through the intermediate part of the objective lens element is displaced in the optical axis direction by about 0.1 mm and the focal point of a light beam having passed through the outer part of the objective lens element is displaced in the optical axis direction by about 0.13 mm. In addition, it is seen that an excessive spherical aberration occurs. Thus, each of the intermediate part and the outer part favorably exerts an aperture limiting function such that the incident light beam for CD is not converged and does not become stray light.

The present invention is applicable to objective lens elements used for performing for performing at least one of recording, reproducing, or erasing of information on optical discs of a plurality of standards for which light beams having different wavelengths are used, and optical pickup devices including the objective lens elements.

While the invention has been described in detail, the foregoing description is in all aspects illustrative and not restrictive. It will be understood that numerous other modifications and variations can be devised without departing from the scope of the invention.

What is claimed is:

1. An objective lens element that has optical function surfaces on an incident side and an exit side, that converges a first incident light beam of a wavelength $\lambda_1$ through a base plate having a thickness $t_1$ to form a spot, and that converges a second incident light beam of a wavelength $\lambda_2$ longer than the wavelength $\lambda_1$ through a base plate having a thickness $t_2$ larger than the thickness $t_1$ to form a spot, wherein:

at least either one of the optical function surfaces is divided into a first region that includes a rotational symmetry axis and through which the first and second incident light beams that substantially contribute to spot formation pass, and a second region that is a ring-shaped region surrounding the first region and through which only the first incident light beam that substantially contributes to spot formation passes;

the first region is provided with a first diffraction structure;

the second region is provided with a second diffraction structure, the second diffraction structure being different from the first diffraction structure; and the objective lens element satisfies the following conditions:

$$DO11 \times DO12 > 0 \quad (1);$$

and $$DO21 \times DO22 < 0 \quad (2),$$

where:

DO11 is the single diffraction order of the diffracted light beam having the highest diffraction efficiency among light beams of the wavelength $\lambda_1$ that are diffracted by the first diffraction structure on the first region;

DO21 is the single diffraction order of the diffracted light beam having the highest diffraction efficiency among light beams of the wavelength $\lambda_2$ that are diffracted by the first diffraction structure on the first region;

DO12 is the single diffraction order of the diffracted light beam having the highest diffraction efficiency among light beams of the wavelength $\lambda_1$ that are diffracted by the second diffraction structure on the second region; and DO22 is the single diffraction order of the diffracted light beam having the highest diffraction efficiency among light beams of the wavelength $\lambda_2$ that are diffracted by the second diffraction structure on the second region.

2. The objective lens element according to claim 1, wherein the objective lens element satisfies the following condition:

$$1.5 \leq (DO22/DO12) - (DO21/DO11) \leq 3.0 \quad (3).$$

3. The objective lens element according to claim 1, wherein the objective lens element satisfies the following condition:

$$-1.0 \leq (DO22/DO12)/(DO21/DO11) \leq -0.3 \quad (4).$$

* * * * *